US012695265B2

(12) United States Patent
Turm et al.

(10) Patent No.: US 12,695,265 B2
(45) Date of Patent: Jul. 28, 2026

(54) APPARATUS, SYSTEM AND METHOD FOR COMPACT ACTIVE FIBER PACKAGING OF A FIBER LASER

(71) Applicant: ELBIT SYSTEMS ELECTRO-OPTICS ELOP LTD, Rehovot (IL)

(72) Inventors: Asaf Turm, Rehovot (IL); Anna Kremen, Rehovot (IL); Yogev Marom, Rehovot (IL)

(73) Assignee: ELBIT SYSTEMS ELECTRO-OPTICS ELOP LTD, Rehovot (IL)

( * ) Notice: Subject to any disclaimer, the term of this patent is extended or adjusted under 35 U.S.C. 154(b) by 0 days.

(21) Appl. No.: 19/203,642

(22) Filed: May 9, 2025

(65) Prior Publication Data

US 2025/0329979 A1      Oct. 23, 2025

Related U.S. Application Data

(63) Continuation of application No. PCT/IB2023/061416, filed on Nov. 12, 2023.

(30) Foreign Application Priority Data

Nov. 13, 2022      (IL) .......................................... 298391

(51) Int. Cl.
*H01S 3/067* (2006.01)
*H01S 3/04* (2006.01)
(52) U.S. Cl.
CPC ........ *H01S 3/06704* (2013.01); *H01S 3/0405* (2013.01)
(58) Field of Classification Search
CPC .. H01S 3/0407; H01S 3/0405; H01S 3/06704; H01S 3/06708; H01S 3/067;
(Continued)

(56) References Cited

U.S. PATENT DOCUMENTS 5,193,756 A   3/1993 Chesler
5,398,256 A   3/1995 Hohimer et al.
(Continued)

FOREIGN PATENT DOCUMENTS

CN      201294326 Y      8/2009
CN      100588052 C      2/2010
(Continued)

OTHER PUBLICATIONS

Haake, J.M., et al., "In Package Micro-Aligner for Fiber-Optic Packaging," 1998 Proceedings. 48th Electronic Components and Technology Conference, 1998, IEEE, pp. 1446-1449.
(Continued)

*Primary Examiner* — Tod T Van Roy
*Assistant Examiner* — Delma R Forde
(74) *Attorney, Agent, or Firm* — S.J. INTELLECTUAL PROPERTY LTD.

(57)      ABSTRACT

Embodiments pertain to a compact fiber packaging apparatus configured to guide an active fiber as part of a high power fiber laser. The apparatus may comprise a base having a front side and a back side. The front side may comprise a front spiral groove of varying radii increasingly extending from an innermost front loop having an innermost radius to an outermost front loop having an outermost radius, and the back side may comprise a back spiral groove of varying radii decreasingly extending from an outermost back loop having an outermost radius to an innermost back loop having an innermost radius. The front spiral groove extends from the innermost front loop to the outermost front loop which connects with the outermost back loop of the back spiral groove to terminate at the innermost back loop.

20 Claims, 18 Drawing Sheets

(58) Field of Classification Search

CPC .............. H01S 3/061; H01S 3/04–042; H01S 3/067–06795; G02B 6/4457; G02B 6/44; G02B 6/4408; G02B 6/4458; G02B 6/268; G02B 6/4266; G02B 6/4271; G02B 6/4269; G02B 6/44458; G02B 6/4268

See application file for complete search history.

(56) References Cited

U.S. PATENT DOCUMENTS

| | | | |
|---|---|---|---|
| 5,515,200 | A | 5/1996 | Delrosso et al. |
| 5,778,132 | A | 7/1998 | Csipkes et al. |
| 6,052,392 | A | 4/2000 | Ueda et al. |
| 6,167,181 | A | 12/2000 | Fukaishi |
| 6,174,648 | B1 | 1/2001 | Terao et al. |
| 6,215,933 | B1 | 4/2001 | Rahn |
| 6,434,295 | B1 | 8/2002 | Maccormack et al. |
| 6,567,600 | B2 | 5/2003 | Yoshida |
| 6,683,892 | B1 | 1/2004 | Yamaura et al. |
| 6,738,554 | B2 | 5/2004 | Daoud et al. |
| 6,795,460 | B1 | 9/2004 | Itoh |
| 6,798,792 | B2 | 9/2004 | Itoh |
| 6,968,112 | B2 | 11/2005 | Zamel et al. |
| 7,072,560 | B1 | 7/2006 | Bramson |
| 7,330,627 | B2 | 2/2008 | Mullaney et al. |
| 7,809,236 | B2 | 10/2010 | Muendel |
| 7,817,884 | B2 | 10/2010 | DeMeritt et al. |
| 8,340,482 | B2 | 12/2012 | Arashitani et al. |
| 8,737,437 | B2 | 5/2014 | Dong et al. |
| 8,958,074 | B1 | 2/2015 | Xu |
| 9,312,654 | B2 | 4/2016 | Taya |
| 9,325,151 | B1 | 4/2016 | Fini et al. |
| 9,337,605 | B2 | 5/2016 | Taya |
| 9,755,394 | B1 | 9/2017 | Bridges |
| 10,574,020 | B2 * | 2/2020 | Hodges ................. H01S 3/0407 |
| 11,146,035 | B2 | 10/2021 | Hovhannisyan et al. |
| 2002/0164144 | A1 | 11/2002 | Daoud et al. |
| 2005/0018950 | A1 | 1/2005 | Arellano |
| 2007/0201518 | A1 | 8/2007 | Rothenberg et al. |
| 2008/0101753 | A1 | 5/2008 | Suzuki et al. |
| 2008/0130010 | A1 | 6/2008 | Williams |
| 2009/0060444 | A1 | 3/2009 | Muendel |
| 2009/0110355 | A1 | 4/2009 | Demeritt et al. |
| 2010/0247055 | A1 | 9/2010 | Arashitani et al. |
| 2014/0240818 | A1 | 8/2014 | Taya |
| 2014/0362876 | A1 | 12/2014 | Schwarzenbach et al. |
| 2015/0331209 | A1 | 11/2015 | Pikulski et al. |
| 2016/0072248 | A1 | 3/2016 | Johnson et al. |
| 2017/0170622 | A1 | 6/2017 | Kashiwagi |
| 2019/0280449 | A1 | 9/2019 | Hodges et al. |

FOREIGN PATENT DOCUMENTS

| | | |
|---|---|---|
| CN | 202997293 U | 6/2013 |
| CN | 105140765 A | 12/2015 |
| CN | 105977770 A | 9/2016 |
| CN | 106159658 A | 11/2016 |
| CN | 106451041 A | 2/2017 |
| CN | 206135196 U | 4/2017 |
| CN | 106711743 A | 5/2017 |
| CN | 106711746 A | 5/2017 |
| CN | 106848817 A | 6/2017 |
| CN | 106990494 A | 7/2017 |
| CN | 206364371 U | 7/2017 |
| CN | 107123921 A | 9/2017 |
| CN | 107153241 A | 9/2017 |
| CN | 206820239 U | 12/2017 |
| CN | 208571214 U | 3/2019 |
| EP | 1011178 B1 | 3/2004 |
| EP | 2991176 A1 | 3/2016 |
| EP | 2372849 B1 | 12/2016 |
| EP | 1975660 B1 | 5/2020 |
| FR | 2815181 A1 | 4/2002 |
| JP | 2001044538 A | 2/2001 |
| JP | 2007158016 A | 6/2007 |
| JP | 2007234711 A | 9/2007 |
| JP | 2010079080 A | 4/2010 |
| JP | 2010177553 A | 8/2010 |
| JP | 2015090909 A | 5/2015 |
| WO | 0141265 A1 | 6/2001 |
| WO | 2001/091252 A2 | 11/2001 |
| WO | 02075864 A2 | 9/2002 |
| WO | 03096491 A2 | 11/2003 |
| WO | 2005057246 A2 | 6/2005 |
| WO | 2007100705 A1 | 9/2007 |
| WO | 2009117371 A1 | 9/2009 |
| WO | 2010103764 A1 | 9/2010 |
| WO | 2015094467 A1 | 6/2015 |
| WO | 2016129447 A1 | 8/2016 |
| WO | 16149435 A1 | 9/2016 |
| WO | 2020021527 A1 | 1/2020 |

OTHER PUBLICATIONS

Israel Office Action for Patent Application No. 298391 dated May 21, 2023, 9 pages.

Israel Office Action for Patent Application No. 298391 dated Nov. 8, 2023, 4 pages.

International Search Report and Written Opinion mailed Jan. 22, 2024 in International Application No. PCT/IB2023/061416, 7 pages.

* cited by examiner

Figure 18:
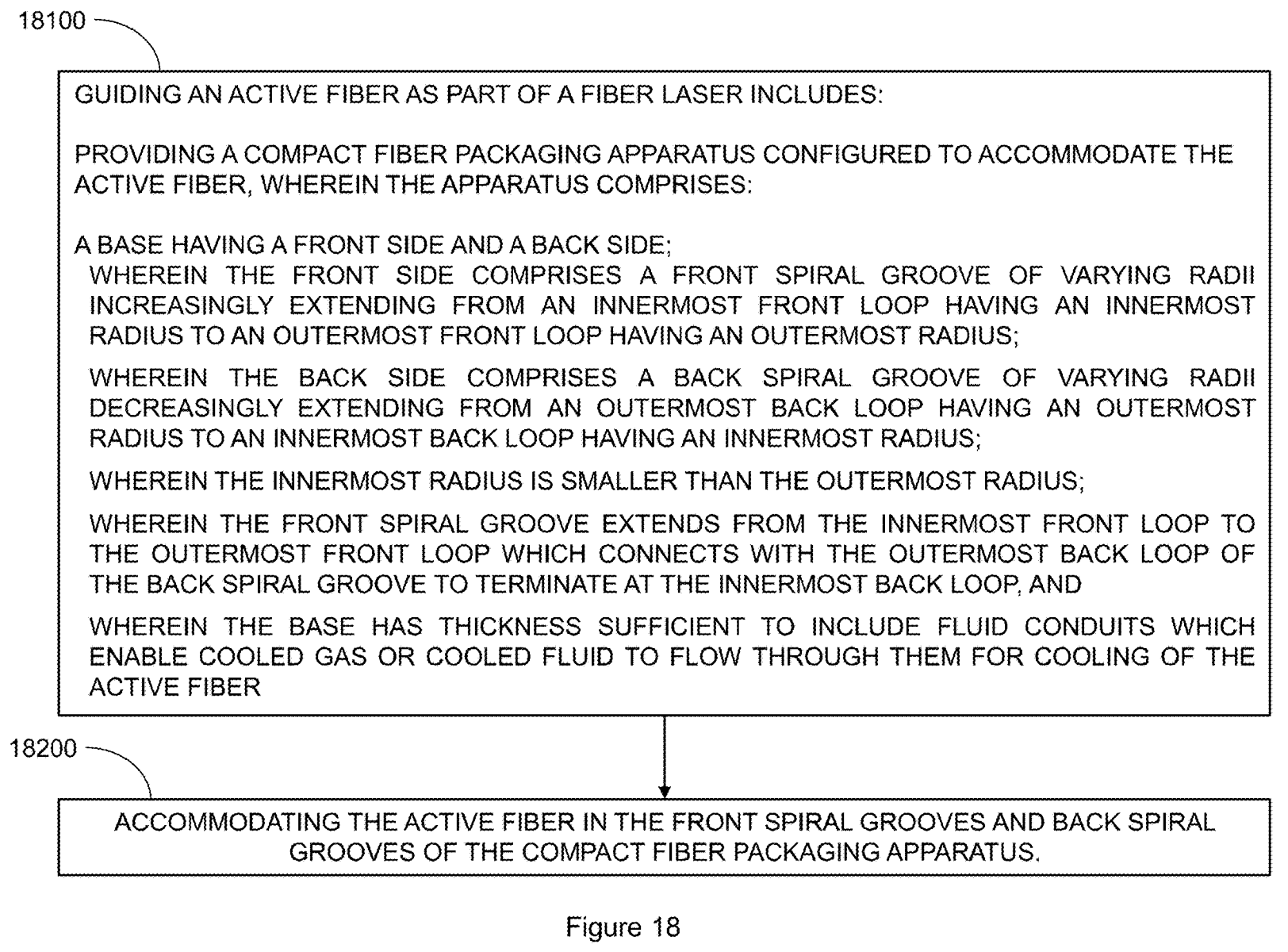

18100

GUIDING AN ACTIVE FIBER AS PART OF A FIBER LASER INCLUDES:

PROVIDING A COMPACT FIBER PACKAGING APPARATUS CONFIGURED TO ACCOMMODATE THE ACTIVE FIBER, WHEREIN THE APPARATUS COMPRISES:

A BASE HAVING A FRONT SIDE AND A BACK SIDE; WHEREIN THE FRONT SIDE COMPRISES A FRONT SPIRAL GROOVE OF VARYING RADII INCREASINGLY EXTENDING FROM AN INNERMOST FRONT LOOP HAVING AN INNERMOST RADIUS TO AN OUTERMOST FRONT LOOP HAVING AN OUTERMOST RADIUS;

WHEREIN THE BACK SIDE COMPRISES A BACK SPIRAL GROOVE OF VARYING RADII DECREASINGLY EXTENDING FROM AN OUTERMOST BACK LOOP HAVING AN OUTERMOST RADIUS TO AN INNERMOST BACK LOOP HAVING AN INNERMOST RADIUS;

WHEREIN THE INNERMOST RADIUS IS SMALLER THAN THE OUTERMOST RADIUS;

WHEREIN THE FRONT SPIRAL GROOVE EXTENDS FROM THE INNERMOST FRONT LOOP TO THE OUTERMOST FRONT LOOP WHICH CONNECTS WITH THE OUTERMOST BACK LOOP OF THE BACK SPIRAL GROOVE TO TERMINATE AT THE INNERMOST BACK LOOP, AND

WHEREIN THE BASE HAS THICKNESS SUFFICIENT TO INCLUDE FLUID CONDUITS WHICH ENABLE COOLED GAS OR COOLED FLUID TO FLOW THROUGH THEM FOR COOLING OF THE ACTIVE FIBER

18200

ACCOMMODATING THE ACTIVE FIBER IN THE FRONT SPIRAL GROOVES AND BACK SPIRAL GROOVES OF THE COMPACT FIBER PACKAGING APPARATUS.

APPARATUS, SYSTEM AND METHOD FOR COMPACT ACTIVE FIBER PACKAGING OF A FIBER LASER

CROSS-REFERENCE TO RELATED APPLICATIONS/CLAIM OF PRIORITY

This application is a continuation application claiming the benefit of International Application No. PCT/IB2023/061416, filed Nov. 12, 2023, which claims domestic and international priority from Israel Patent Application No. 298391 filed Nov. 13, 2022, granted as Israel U.S. Pat. No. 298,391 on Oct. 1, 2024 titled "APPARATUS, SYSTEM AND METHOD FOR COMPACT ACTIVE FIBER PACKAGING OF A FIBER LASER", which is incorporated herein by reference in its entirety.

BACKGROUND

Fiber lasers are based on one or several amplification stages occurring in doped optical fibers (active fiber).

The active fiber is pumped by pump light emitted by at least one fiber-coupled diode. Pump light enters the fiber's clad and propagates through the core, interacting with dopants of the doped fiber portion. Interaction of the pump light with the dopants results in light emission in the fibers core. Characteristics of light emitted from the fiber laser may be set by Bragg gratings in an oscillator-based laser or by the signal from the previous amplification stage in an amplifier-based laser.

The design of high power lasers requires a careful design of the apparatus architecture in which the fiber is placed and held, especially at the final amplification level with high power light which causes the active fiber to heat up. The apparatus' design considerations are maintaining a proper fiber temperature, eliminating or preventing thermal mode instability (TMI) while maintaining a compact laser design.

For example, the apparatus should be configured to ensure, during operation, sufficient heat removal from the fiber, while protecting the fiber from external sources of stress that could damage the fiber and/or cause degradation of a signal being transmitted via the fiber. For example, a fiber should not be bent too sharply to prevent from portions of transmitted light to leak out, rather than being reflected within the fiber core, thereby reducing the gain. In addition, overbending the fiber may fracture or otherwise damage the fiber.

The description above is presented as a general overview of related art in this field and should not be construed as an admission that any of the information it contains constitutes prior art against the present patent application.

BRIEF DESCRIPTION OF THE DRAWINGS

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The number of elements shown in the Figures should by no means be construed as limiting and is for illustrative purposes only. The figures are listed below.

FIG. 18 is a flowchart of a method for using the compact active fiber packaging apparatus, according to some embodiments.

DETAILED DESCRIPTION

Figure 1:
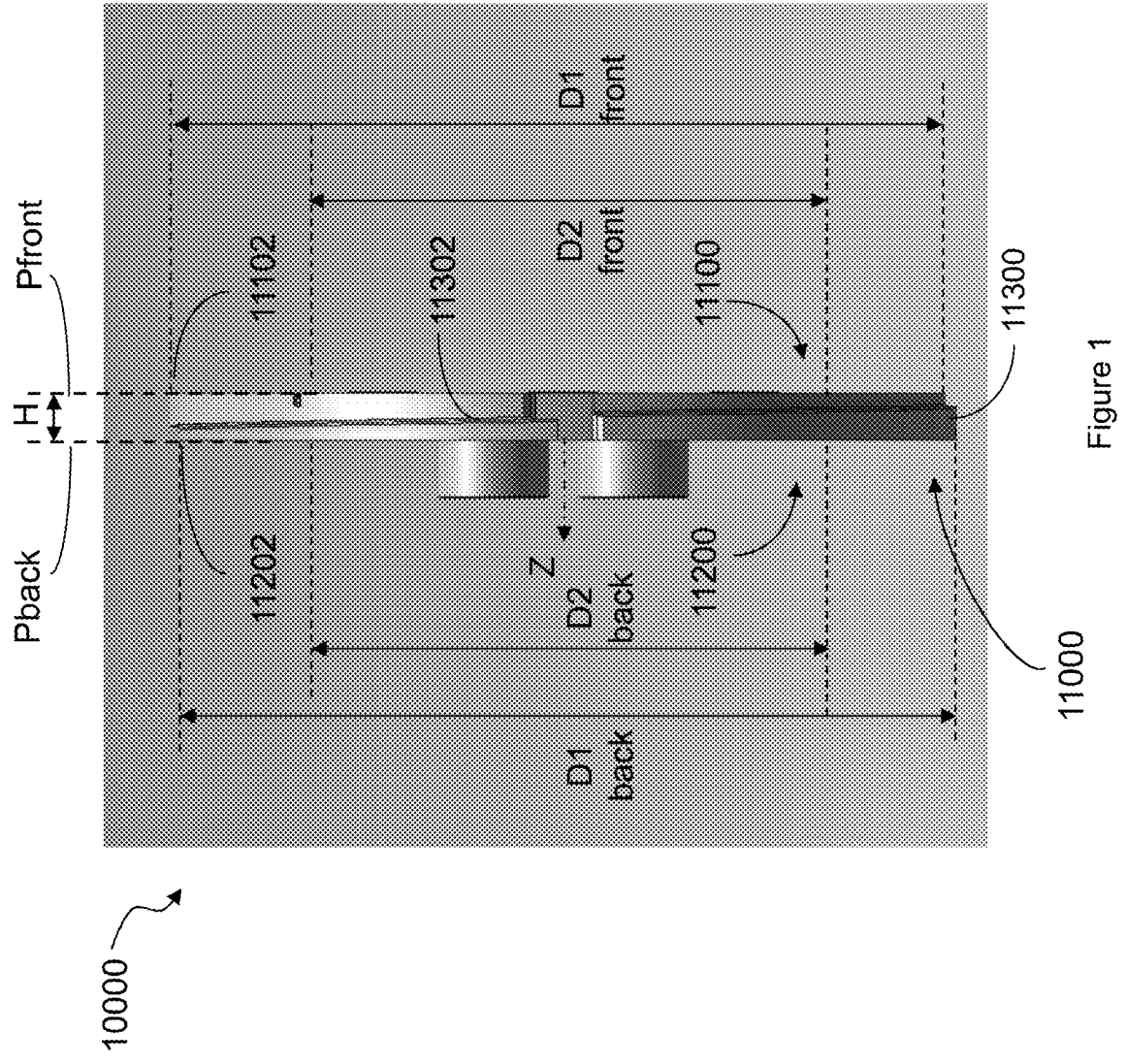
FIG. 1 is a schematic side view illustration of a compact active fiber packaging apparatus, according to some embodiments.

The present apparatus relates to fiber lasers. More particularly, the present apparatus relates to a packaging apparatus for an active fiber of a fiber laser. The packaging apparatus has comparatively compact geometry for accommodating the active fiber. The active fiber may be a part of an oscillator-based laser or an amplifier-based laser.

Despite its comparatively compact geometry, the apparatus exhibits comparatively high operational stability (e.g., prevents the development, for given operational characteristics, thermal mode instability (TMI)), alongside comparatively efficient cooling characteristics. For example, the apparatus is configured such that, during operation, a TMI-related threshold is not or never crossed. In other words, the apparatus may be configured such that a fiber accommodated by the apparatus may allow amplification below a TMI-related threshold.

As a result, during operation, embodiments of the apparatus configuration ensure that low mode input laser light characteristics remain constant or substantially constant along the entire length of the active fiber.

The expression "compact geometry" as used herein is to indicate that the apparatus occupies a relatively small volume, with respect to a desired gain or output power. In some implementations, the expression "compact geometry" as used herein is to indicate that the apparatus spans a relatively small area, with respect to a desired gain or output power. For example, to achieve a desired gain and/or output power, an area that must be occupied by a prior art apparatus may have to be at least twice as large than that of the apparatus according to embodiments disclosed herein.

Increased fiber temperature causes increase of the fiber's refractive index which, in turn, may require decreasing of the bending radii to maintain a same stripping efficiency or effect of the higher mode as it was before the temperature in the fiber increased.

The amount of heat that is generated in the fiber decreases along the fiber from the input to the output, requiring to match the fiber's bending radii to the fiber temperature profile, since decreasing a bending radius at low temperature may cause dissipation of the main mode (the laser power). Therefore, risk to cross a threshold indicative of or relating to TMI is enhanced at the first several inner loops of an active fiber where most of the pump power is absorbed.

Stripping the higher mode is possible by bending the fiber to have a radius of curvature that is between a low-limit and high-limit stripping radius of curvature.

Known apparatuses disclose configurations where the fiber is accommodated such to initially spiral with decreasing radii, from the fiber inlet and in direction of pump light propagation, from an outer spiral loop having a large radius towards an inner spiral loop having a small radius. However, such known apparatuses prevent or are counterproductive to higher mode stripping at the initial (larger) fiber loops. As a result, in configurations suggesting initial decreasing radii, the threshold of the TMI will be reached at a comparatively lower lasing power, thereby limiting the lasing output power that can be drawn from the active fiber. Such configurations would be counterproductive to maximizing the output power that can be drawn from a fiber laser without approaching the threshold of the TMI already at the initial loops, let alone passing the TMI threshold.

The active fiber packaging apparatus according to embodiments is configured to enable comparatively tight coiling of the active fiber according to the temperature profile of the fiber, and thus, stripping all modes greater than a main mode, thus, reducing TMI or preventing the crossing of a threshold relating to TMI, while maintain lasing power, at comparatively compact fiber packaging geometry.

Figure 2:
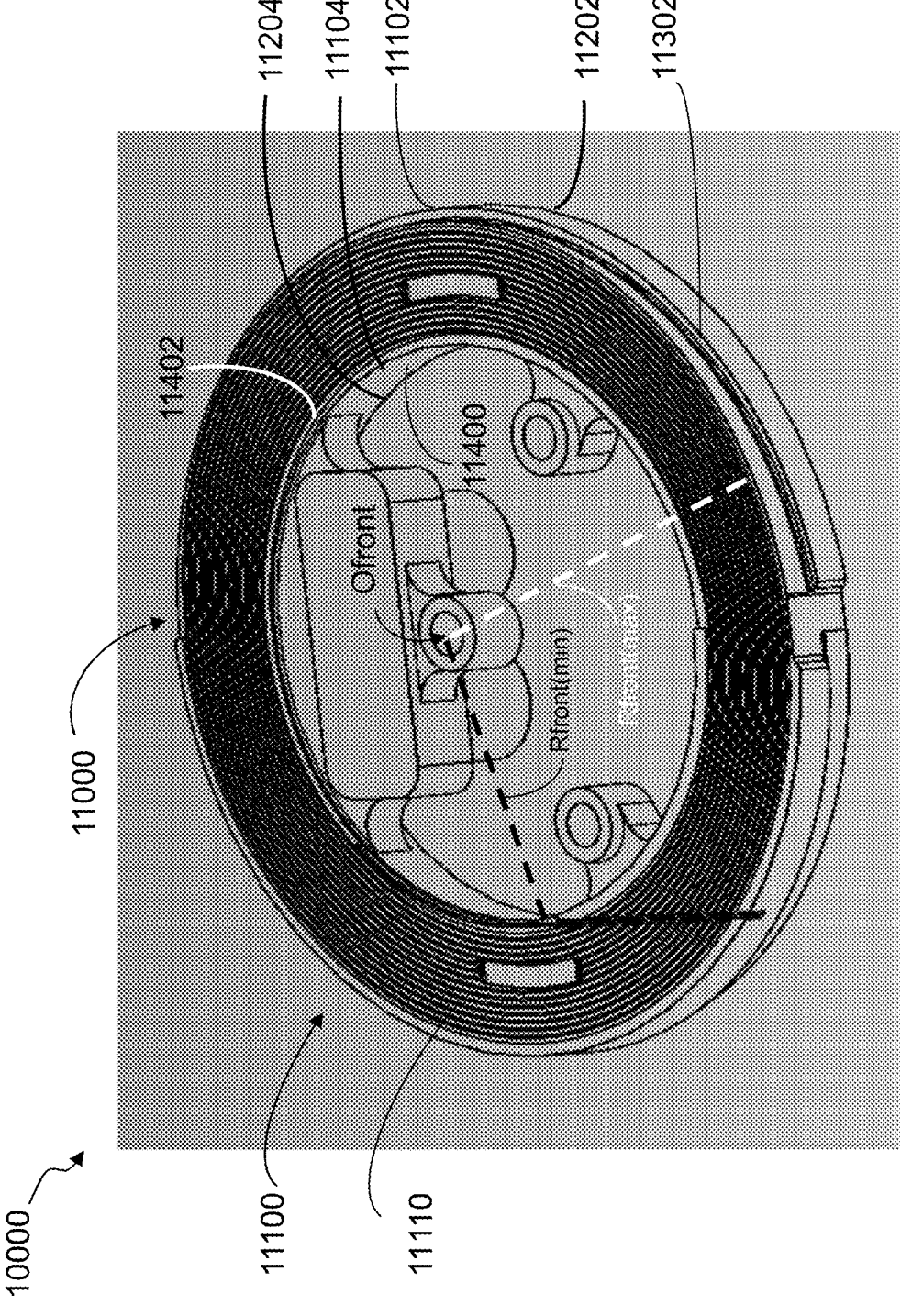
FIG. 2 is a schematic front view illustration of the compact active fiber packaging apparatus, according to some embodiments.

Reference is now made to FIG. 1 and FIG. 2. In some embodiments, an active fiber packaging apparatus 10000 includes a base 11000 that is configured to allow two-sided spiral accommodation of a same fiber, e.g., coiled using comparatively small radii of curvature.

Apparatus 10000 is configured such that the same fiber can be accommodated so that neighboring active fiber portions of a same side of the plate are sufficiently insulated and/or isolated (e.g., separated) from each other to prevent any (e.g., evanescent) interaction between two neighboring or adjacent active fiber portions.

Base 11000 of apparatus 10000 includes an annular front side 11100 and an annular back side 11200. Annular front side 11100 is bounded by an outer front rim 11102 and an inner front rim 11104. Annular back side 11200 is bounded by an outer back rim 11202 and an inner back rim 11204.

Apparatus 10000 further includes an external or outer base surface 11300 extending from outer front rim 11102 of the front side to outer back rim 11202 of annular back side 11200 to form a plate-shaped body or base. Apparatus 10000 further includes an inner base surface 11400 extending from inner front rim 11104 of annular front side 11100 to inner back rim 11204 of annular back side 11200 to form a plate-shaped body or base.

Outer base surface 11300 extends between outer front rim 11102 and outer back rim 11202, and inner base surface 11400 extends between inner front rim 11104 and inner back rim 11204 to form an annular plate-shaped body.

In some examples, annular front side 11100 and annular back side 11200 may have an about circular shape. Hence, in some examples, base 11000 may be disk-shaped. The expressions "annular front side" and "annular back side" may herein simply be referred to as "front side" and "back side", respectively.

While the embodiments discussed herein refer to an apparatus comprising an about circular or disk-shaped base, this should by no means be construed as limiting. For example, in some examples, the outer surface and/or the front side and/or the back side may delineate a non-circular cylindrical shape. In some examples, the front side and the back side may have dissimilar geometric shapes.

In some embodiments, outer base surface 11300 has an outer surface path configured for accommodating a portion of the fiber. In some embodiments, inner base surface 11400 has an inner surface path 11402 configured for accommodating a portion of the fiber.

Front side 11100 comprises a front spiral groove 11110, and back side 11200 of base 11000 comprises a back spiral groove 11210. Outer base surface 11300 includes an external (also: outer) surface path 11302 (e.g., groove and/or loop) for communicably coupling front spiral groove 11110 with back spiral groove 11210 to allow accommodation of a same optical fiber by inner surface path 11402, front spiral groove 11110, external surface path 11302 and back spiral groove 11210. In some examples, base 11000 may also include a fiber entry track and a fiber exit track.

Apparatus 10000 is configured such to allow active fiber accommodation in manner that is within the active fiber's operation specification. The apparatus allows accommodation of an active fiber in a manner that avoids excessive twists and/or bends which, if they had to be applied, may lead to power losses and/or inoperability of the active fiber.

In some embodiments, base 11000 has a thickness sufficient to include conduits through which cooling fluid (e.g., air, gas and/or fluid) can flow for cooling of an active fiber accommodated by the apparatus.

According to some embodiments, apparatus 10000 may be integrally formed or monolithically integrated by the same material. In some examples, the apparatus may be manufactured using additive manufacturing (also: 3D-printing) technologies, or casting technologies. In some embodiments, the apparatus may be assembled from distinct parts.

In some examples, base 11000 of the apparatus 10000 may have a thickness of 12 mm or less, 8 mm or less, or 6 mm or less, and may be made of a variety of materials including, for example, aluminum, Copper, etc. The base of the apparatus may comprise or consist of material having a comparatively high thermal conductivity to allow, during operation, removal or transfer of heat from the fibers via the material through the cooling fluid. In some examples, the base' thermal conductivity may be, for example, $$250 \frac{W}{mK}.$$

Elements of front side 11100 may lie on or define a virtual front plane Pfront, and elements of back side 11200 may lie on or define a virtual back plane Pback, e.g., as exemplified herein.

In some examples, the annular plate-shaped body has a height (also: thickness) H, an outer front side diameter D1front, and inner front side diameter D2front, and outer back side diameter D1back, and an inner back side diameter D2back. In some embodiments, the height of outer base surface 11300 may differ from the height of inner base surface 11400.

It is noted that the term "diameter" as used herein may refer to the largest distance between two points of the respective rim. For example, the expression "outer front side diameter" refers to the largest distance between two points along rim 11102.

Outer front side diameter D1front and outer back side diameter D1back may be at least 8 to at least 20 times larger than the height H of the outer surface, such that the base may be considered "flat". In some examples, front side outer diameter D1front and back side outer diameter D1back may be of equal magnitude. In some examples, front side outer diameter D1front and back side outer diameter D1back may be of different magnitude.

In some examples, virtual front plane Pfront and/or virtual back plane Pback may each be definable by a single normal vector, i.e., the virtual front plane Pfront and/or the virtual back plane Pback may be flat surfaces. In some examples, virtual front plane Pfront and/or virtual back plane Pback may resemble a deformed (i.e., non-straight) plane, i.e., curved surfaces (having e.g., single or multiple-curved surfaces).

In some examples, front side inner diameter D2front and back side inner diameter D2back may be of equal magnitude. In some examples, front side inner diameter D2front and back side inner diameter D2back may have different magnitude.

Figure 3:
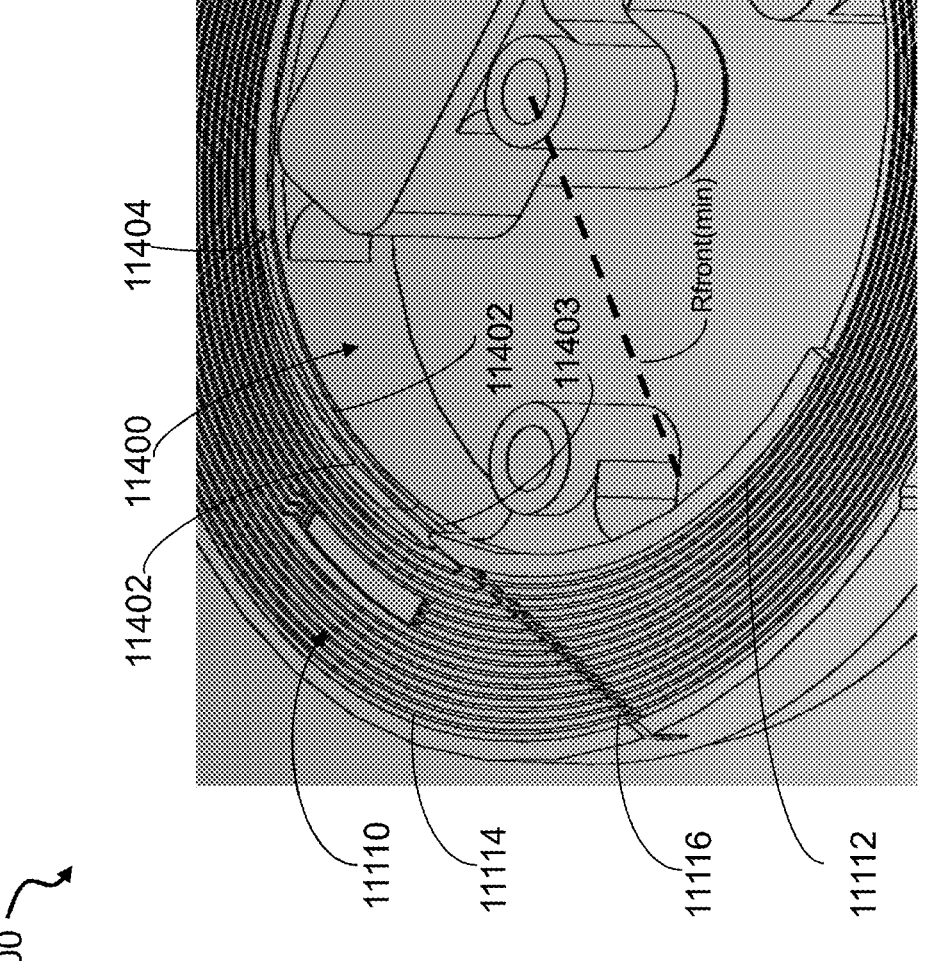
FIG. 3 is a schematic partial front view illustration of the compact active fiber packaging apparatus, according to some embodiments.
Figure 4:
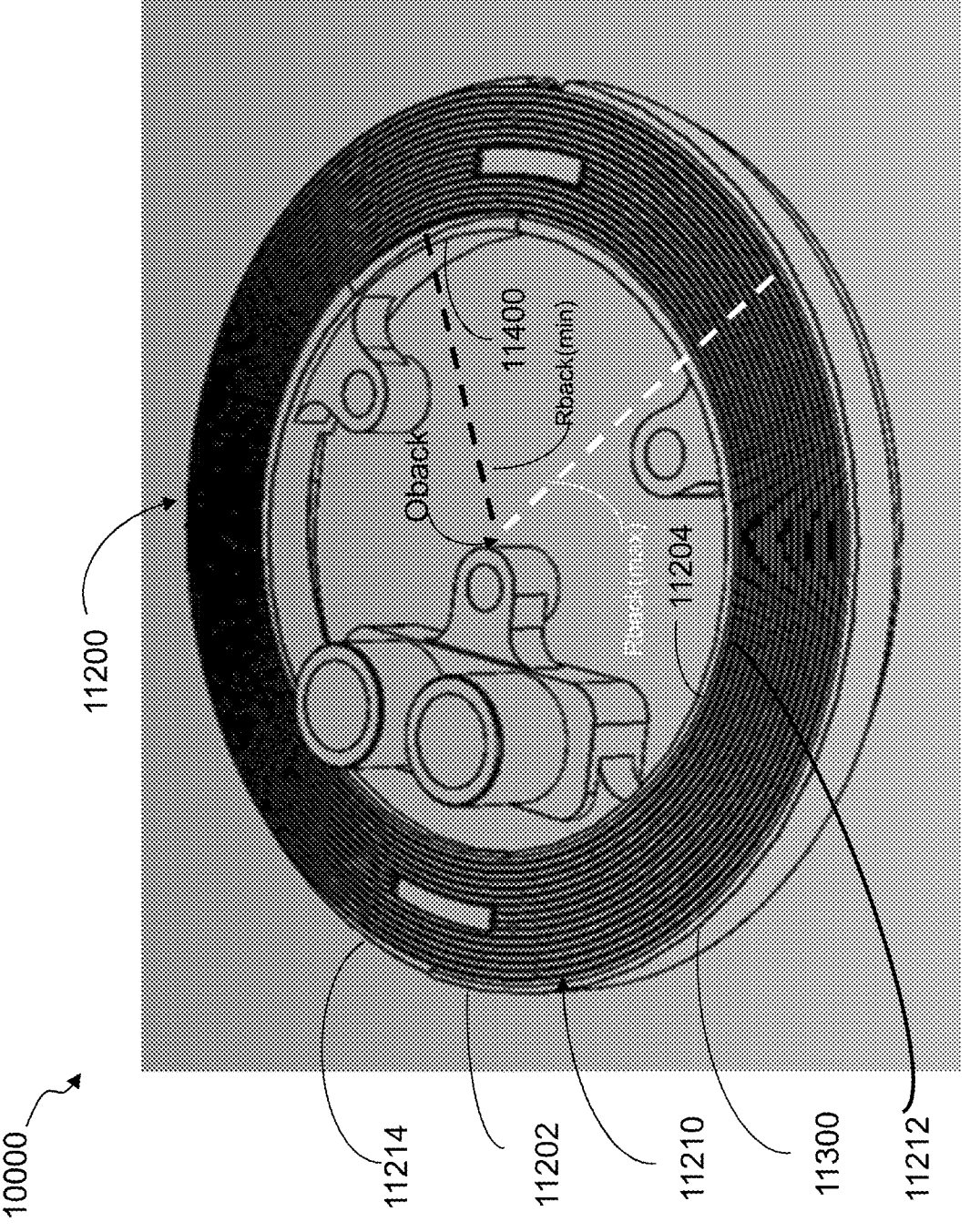
FIG. 4 is a schematic back view illustration of the compact active fiber packaging apparatus, according to some embodiments.

Additional reference is made to FIG. 3 and FIG. 4. Front spiral groove 11110 has varying radii Rfront increasingly extending from an innermost front loop 11112 having an innermost radius Rfront(min), to an outermost front loop 11114 having an outermost radius Rfront(max), with respect to a front center point Ofront.

Front spiral groove 11110, which extends from the innermost front loop 11112 to the outermost front loop 11114, connects continuously with an outermost back loop 11214 (FIG. 4) of a back spiral groove 11210, which extends to terminate at an innermost back loop 11212. This way, packaging apparatus 10000 can accommodate the same fiber laser.

Figures 5A, 5B:
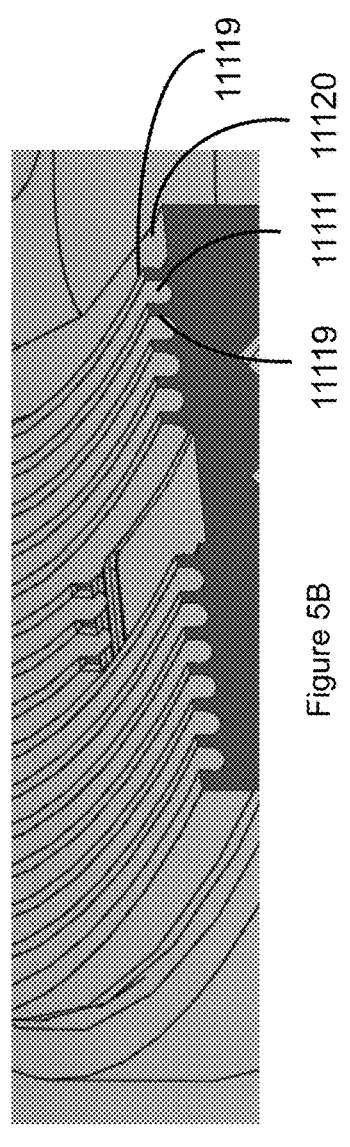
FIG. 5A is a schematic partial back view illustration of the compact active fiber packaging apparatus, according to some embodiments.
FIG. 5B is a schematic partial cross-sectional view illustration of the compact active fiber packaging apparatus, according to some embodiments.

As shown in FIG. 5A, back spiral groove 11210 has varying radii Rback decreasingly reducing from outermost back loop 11214 having an outermost radius Rback(max), to innermost back loop 11212 having an innermost radius Rback(min) with respect to a back center point Oback.

Reference is now made to FIG. 5B. A groove 11111 of front spiral groove 11110 may be formed by two neighboring ridges 11119, which are elevated relative to a base surface 11120 of the same groove. In some examples, two neighboring grooves may share a common ridge. Analogously, a groove of back spiral groove 11210 may be formed by two neighboring ridges, which are elevated relative to a base of the same groove. In some examples, two neighboring back spiral grooves may share a common ridge.

In some examples, the widths and/or heights of front spiral groove 11110 and the back spiral groove 11210 may be substantially identical. In some examples, the widths and/or heights of at least two loops of front spiral groove 11110 and/or at least two loops of back spiral groove 11210 may differ from each other.

In some embodiments, front spiral groove 11110 and back spiral groove 11210 have a configuration which enables arranging the fiber therein while preventing twists and bends which, if they had to be applied, may lead to losses. The circular shape of the plurality of densely arranged loops of each spiral groove allows for maximum higher order mode curvature loss to aid in thermal modal instability suppression.

In accordance with some embodiments, front spiral groove 11110 and back spiral groove 11210 extend along a spiral path having radii and a length allowing, with respect to given operating parameter values of an active fiber accommodated in the spiral grooves, the suppression of thermal mode instability during operation of the active fiber.

In some embodiments, a spatial density of spiral grooves may be constant or vary. In some examples, a spatial groove density may decrease or increase with increasing radii. In some examples, front side 11100 and back side 11200 may have identical spiral groove characteristics.

In some other examples, front side 11100 and back side 11200 may have different spiral groove characteristics.

In accordance with some embodiments, the loops of front spiral groove 11110 and/or of the back spiral groove 11210 may each follow the path of a plurality of arcuate loops, which may delineate various spiral paths, including, for example, an Archimedean spiral, Fermat's spiral, Fibonacci spiral, hyperbolic spiral, Nielsen's spiral or a Doppler spiral. In some examples, a loop of a spiral may delineate an about elliptic path or oval path. In some examples, front spiral groove 11110 and/or back spiral groove 11210 may be free of linear sections.

In some embodiments, front side 11100 and back side 11200 may be parallel or substantially parallel relative to each other. In some other embodiments, front side 11100 and back side 11200 may be non-parallel. In some examples, the ridges and/or the bases of front spiral groove 11110 and/or of back spiral groove 11210 may be taken as a reference for determining whether front side 11100 and back side 11200 are parallel or non-parallel relative to each other. In some embodiments, the ridges and/or the bases of front spiral grooves 11110 may be coplanar or non-coplanar. In some embodiments, the ridges and/or the bases of back spiral grooves 11210 may be coplanar or non-coplanar. In some examples, the ridges of front spiral groove 11110 may lie on and, therefore, define virtual front plane Pfront. In some examples, the ridges of back spiral groove 11210 may lie on and, therefore, define the virtual back plane Pback.

In some embodiments, Ofront and Oback may lie on or define a rotational symmetry axis Z of disk-shaped base, which may be common to both the front side 11100 and the back side 11200. In some other embodiments, Ofront and/or Oback may be offset with respect to the rotational symmetry axis Z of the disk-shaped base. In some other implementations, front side 11100 and back side 11200 may have different rotational symmetry axes.

In some examples, the loops of front spiral groove 11110 and/or of back spiral groove 11210 may be constructed to be mathematically definable with respect to Ofront and Oback, respectively.

In some examples, the loops of front spiral groove 11110 and/or of back spiral groove 11210 may not be constructed such to be mathematically definable with respect to Ofront and/or Oback, respectively.

Merely to simplify the discussion that follows, all radii discussed herein are considered to have a common center point. However, this should by no means be construed in a limiting manner. Accordingly, at least two front spiral grooves may have different center points and/or at least two back spiral grooves may have different center points.

Figure 6:
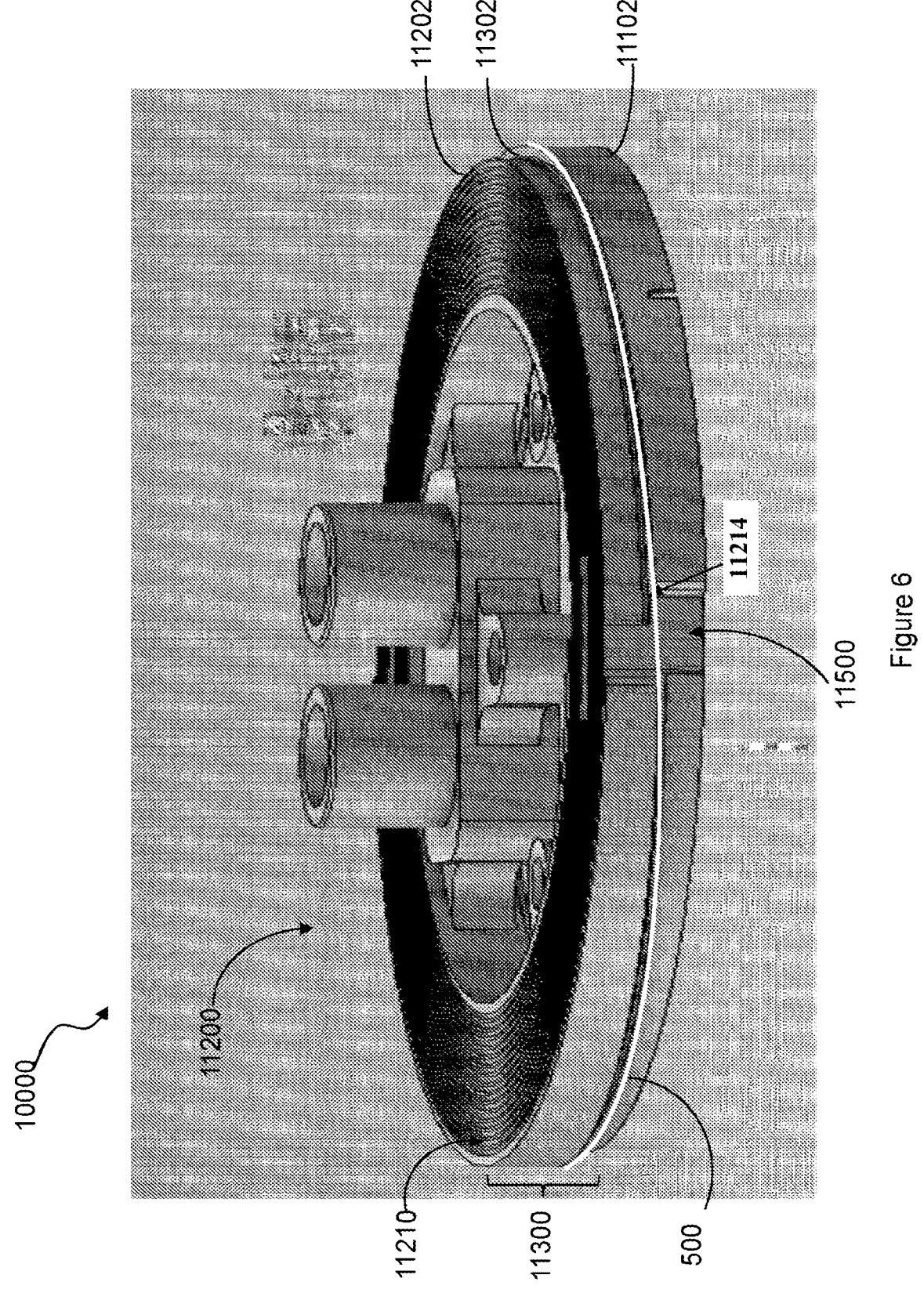
FIG. 6 is a further schematic illustration of the compact active fiber packaging apparatus with an accommodated fiber, according to some embodiments.
Figure 7:
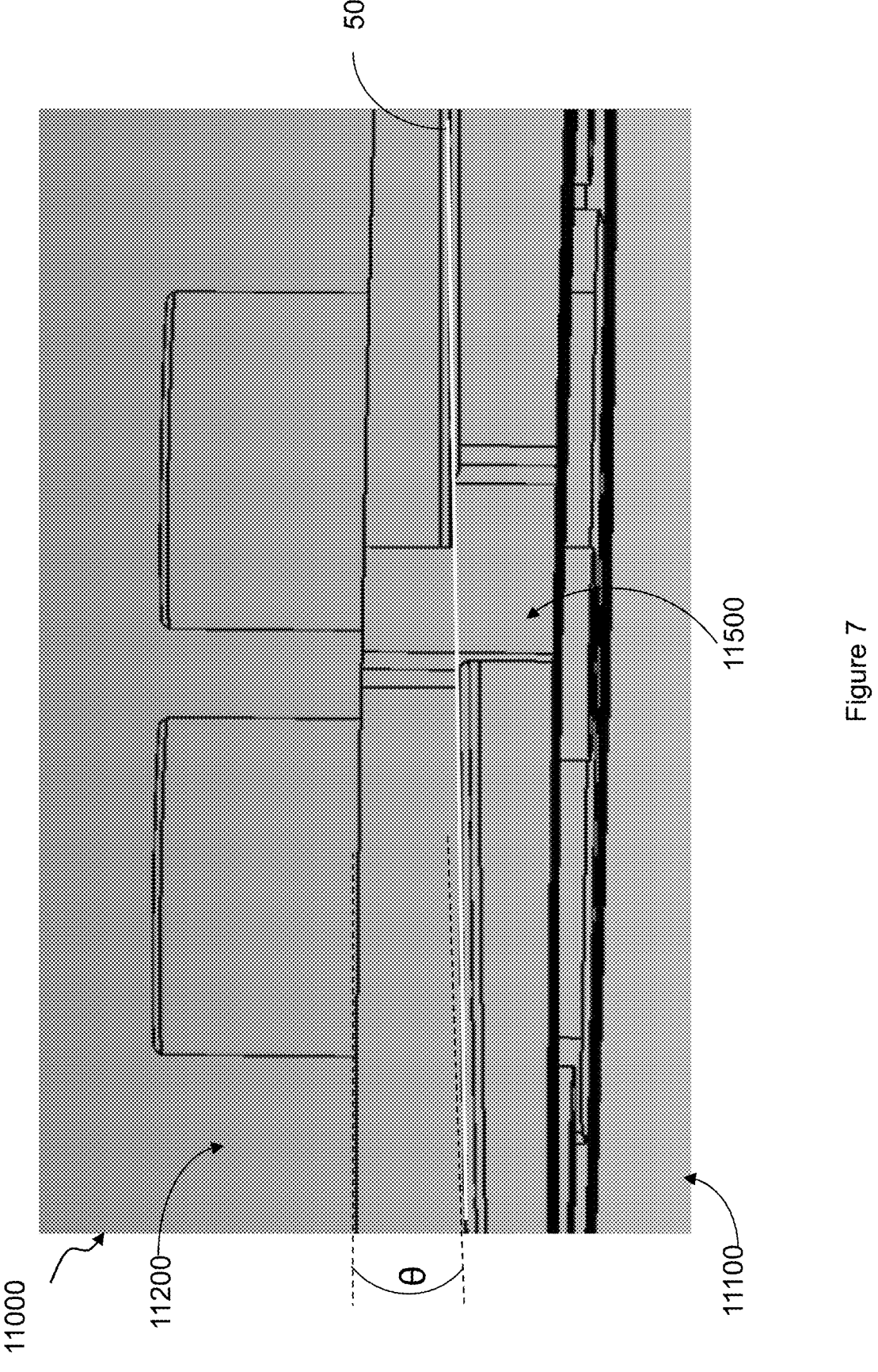
FIG. 7 is a schematic partial view of an outer base surface of the compact active fiber packaging apparatus with an accommodated fiber, according to some embodiments.

Additional reference made to FIGS. 6 and 7. In some embodiments, front spiral groove 11110 extends from the innermost front loop 11112 to the outermost front loop 11114 and connects continuously with the outermost back loop 11214 of the back spiral groove 11210 via outer base surface 11300 that may include an outer surface path 11302, which may for example be implemented as a track, groove and/or a step, configured for accommodating and supporting a portion of an active fiber 500 extending from the outermost front loop 11114 to outermost back loop 11214. In some examples, outer surface path 11302 may have a thread-like, curved or arcuate configuration, delineating a partial loop or at least one full loop, e.g., a helical path.

Outer surface path 11302 may have a slanted or angular orientation θ relative to the orientation of the front side 11100 and the back side 11200. In some examples, the angular orientation θ of outer surface path 11302 may be constant, and in some other examples, the angular orientation θ of outer surface path 11302 may vary along the route traversed by the path. In some examples, outer surface path 11302 may delineate a helical geometry. Outer surface path 11302 is configured to avoid overbending of the corresponding active fiber portion.

As already mentioned herein, inner base surface 11400 includes an inner surface path or track 11402, for example implemented as a groove, track and/or step, and extends from the outlet of a fiber entry track (or input section) 11116 for continuously accommodating or guiding a fiber portion of active fiber 500. Inner surface path 11402 extends from an inner surface path inlet 11403 to an inner surface path outlet 11404 of innermost front loop 11112 of front spiral groove 11110. In some embodiments, fiber entry track 11116 may extend entirely in a linear manner. In some embodiments, fiber entry track 11116 may be linear and become at least partially curved or arcuate, for example, as it comes closer to the track outlet, e.g., to approximate or progressively approximate the curvature of inner surface path 11402.

Inner surface path 11402 may have a slanted or angular orientation relative to the orientation of the front side 11100 and the back side 11200. In some examples, the angular orientation of inner surface path 11402 may be constant, and in some other examples, the angular orientation of inner surface path 11402 may vary along the route traversed by the path. In some examples, inner surface path 11402 may delineate a helical geometry. Inner surface path 11402 may be configured to avoid overbending of the corresponding active fiber portion.

In some examples, inner surface path 11402 may cover a full circumference of inner base surface 11400. In some examples, inner surface path 11402 may cover only a partial circumference along inner base surface 11400. In some examples, inner surface path 11402 may cover a plurality of full circumferences of inner base surface 11400. In some examples, inner surface path 11402 may cover at least one full circumferences of inner base surface 11400 as well as an additional partial circumference. Correspondingly, inner surface path 11402 may traverse only a partial loop of a helical path, one or more full loops of a helical path, or one or more full loops as well as an additional partial loop of, e.g., a helical path. In some examples, inner surface path 11402 may have a thread-like configuration.

Figure 8:
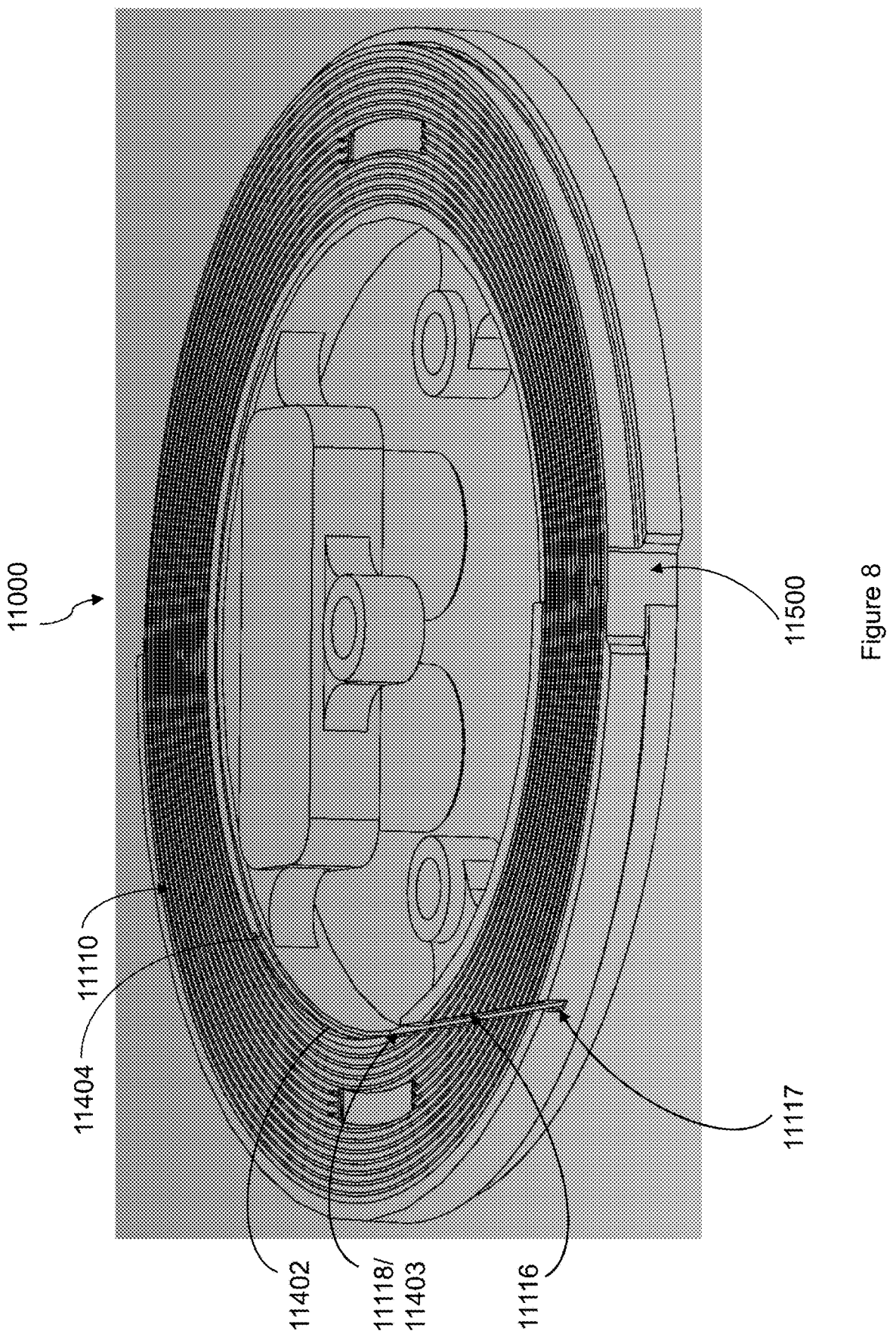
FIG. 8 is another schematic illustration of the compact active fiber packaging apparatus, according to some embodiments.
Figure 9B:
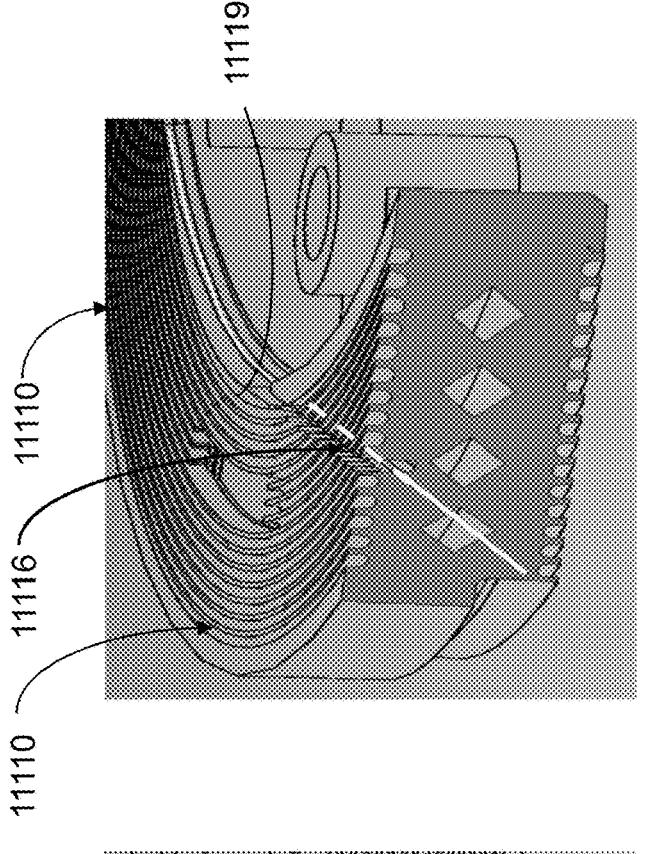
FIGS. 9A and 9B are schematic illustrations of an inlet track of the compact active fiber packaging apparatus with an accommodated fiber, according to some embodiments.
Figure 9A:
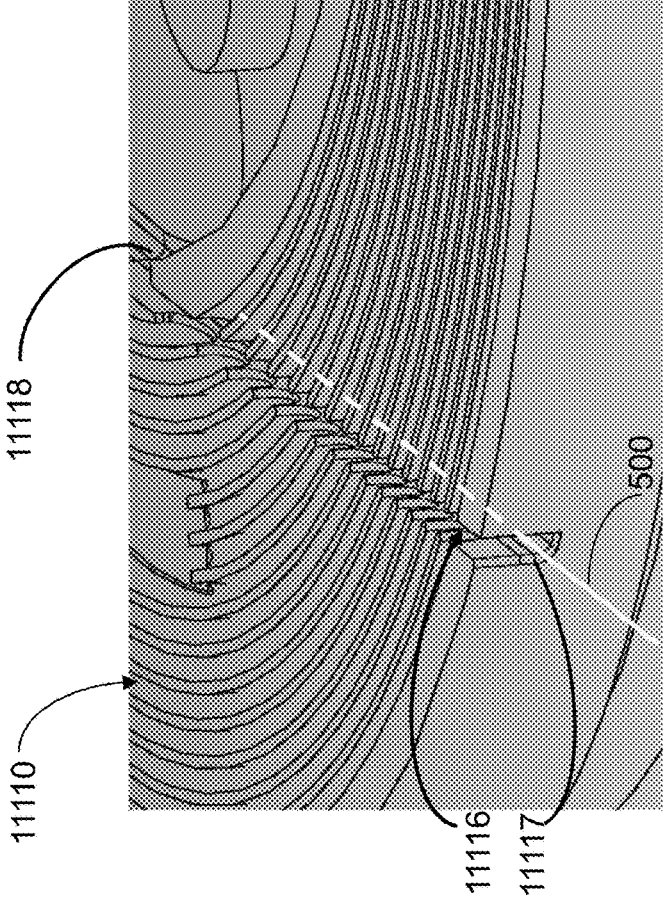

Additional reference is made to FIGS. 8, 9A and 9B. In some embodiments, fiber entry track 11116 extends from a front fiber track inlet 11117 of outer base surface 11300 to terminate at a front fiber track outlet 11118, at inner surface path inlet 11403 of inner surface path 11402. In some examples, fiber entry track 11116 may be disposed and, e.g., partially or fully linearly, extend into base 11000 underneath the loops of front spiral groove 11110, between front spiral groove 11110 and outer surface path 11302. For example, the fiber entry track 11116 extends underneath the front spiral grooves 11000 from the outer base surface 11300 to the inner base surface 11400.

This way, the portion of the fiber that accommodated within fiber entry track 11116 does not engage or interfere with the fiber portion accommodated by front spiral groove 11110 and back spiral groove 11210.

Front fiber track outlet 11118 and inner surface path inlet 11403 may define a first inner transition region. Inner surface path outlet 11404 and the inlet to innermost front loop 11112 may define a second inner transition region. In some examples, the first inner transition region between front fiber track outlet 11118 to inner surface path 11402, and the second inner transition region between inner surface path outlet 11404 and the inlet to innermost front loop 11112 may be configured such to avoid overbending of active fiber 500, e.g., at the respective transition regions and along inner surface path 11402.

Figure 10:
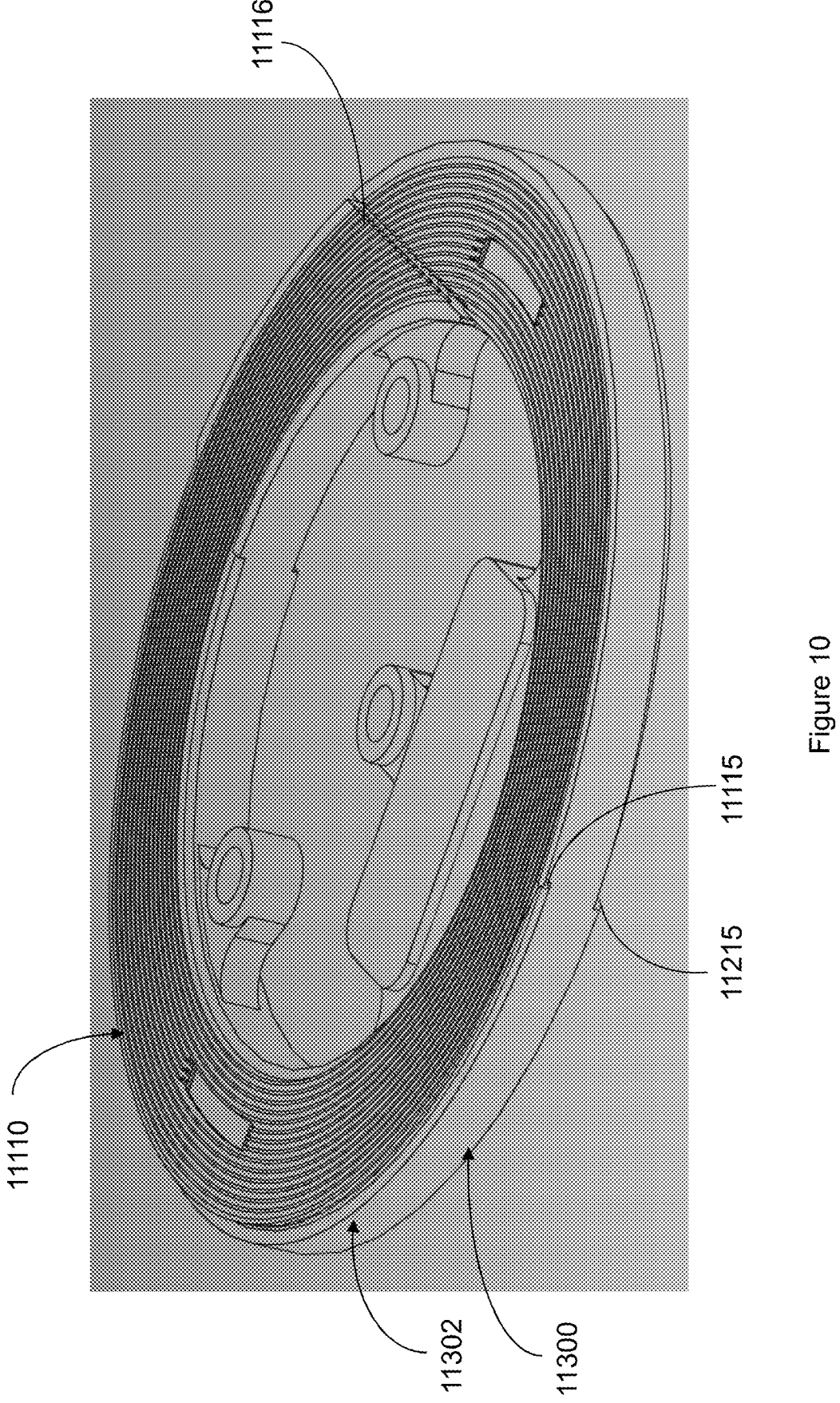
FIG. 10 is a yet other schematic illustrations of the compact active fiber packaging apparatus, according to some embodiments.

Additional reference is made to FIG. 10. As mentioned herein above, outer base surface 11300 includes outer surface path 11302 having an outer base track inlet 11303 and an outer base track outlet 11304. Outer surface path 11302 extends from the outlet 11115 of outermost front loop 11114 to the inlet 11215 of outermost back loop 11214. Outer base track inlet 11303 and the outlet of outermost front loop 11114 form or define a first outer transition region, and outer base track outlet 11304 and the inlet of outermost back loop 11214 form or define a second outer transition region. The first outer transition region and the second outer transition region may be configured to such to avoid overbending of fiber 500, e.g., at the respective transition regions along outer surface path 11302.

In some examples, outer surface path 11302 may cover a full circumference of outer base surface 11300. In some examples, outer surface path 11302 may cover only a partial circumference along outer base surface 11300. In some examples, outer surface path 11302 may cover a plurality of full circumferences of outer base surface 11300. In some examples, outer surface path 11302 may cover at least one full circumferences of outer base surface 11300 as well as an additional partial circumference. Correspondingly, outer surface path 11302 may traverse only a partial loop of a helical path, one or more full loops of a helical path, or one or more full loops as well as an additional partial loop of, e.g., a helical path.

Figures 11A, 11B:
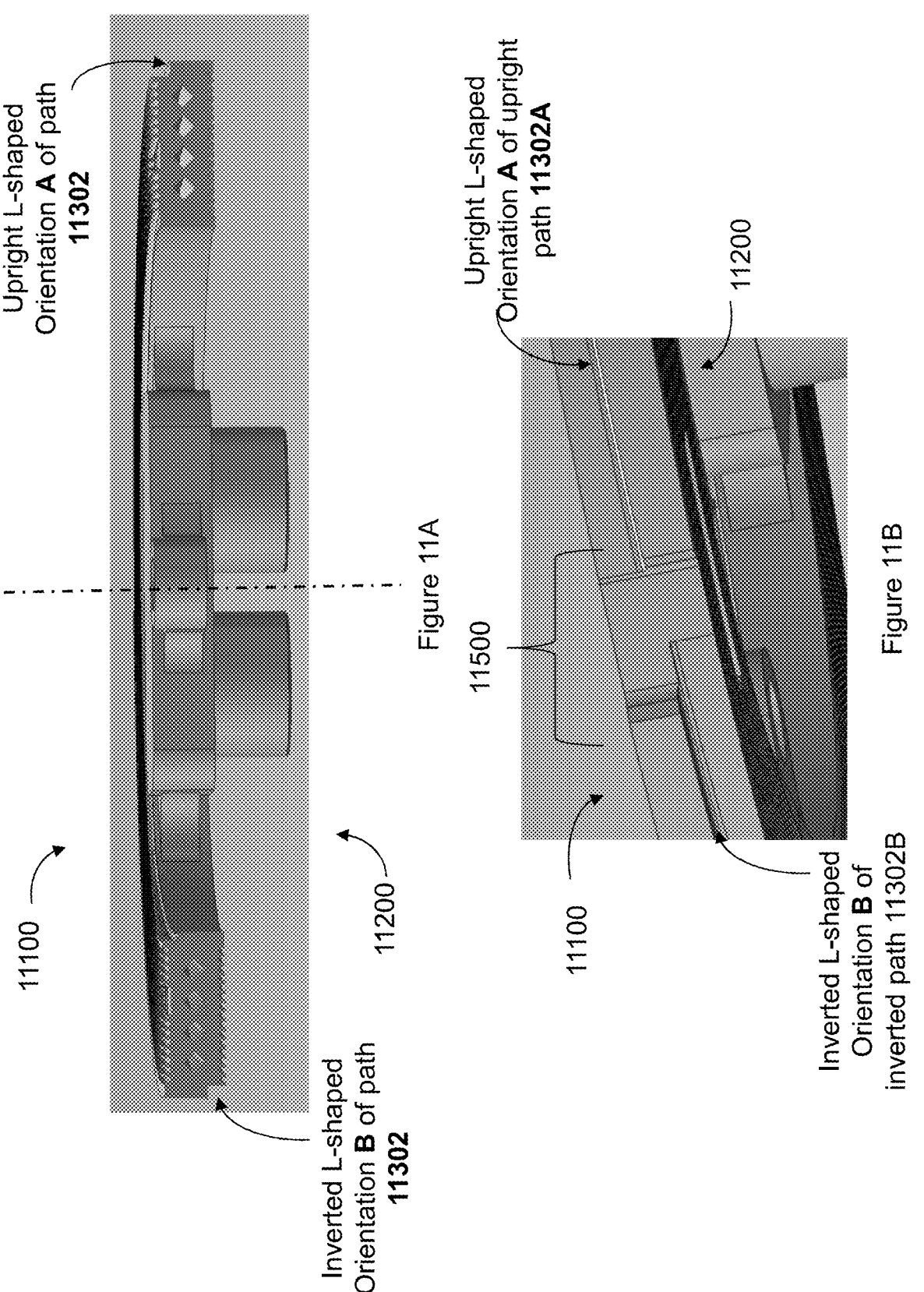
FIG. 11A is another schematic cross-sectional view of the compact active fiber packaging apparatus, according to some embodiments.
FIG. 11B is a schematic illustration of an inversion section of an outer base surface of the compact active fiber packaging apparatus, according to some embodiments.

Further reference is made to FIGS. 11A and 11B. In some embodiments, outer surface path 11302 has a step-like cross-section that is in a first (upright) orientation A along an upright section 11302A, with (e.g., progressively) decreasing step height relative to the virtual front surface Pfront as it extends from front side 11100 towards back side 11200 until the step-like cross-section inverts to attain a second (inverted) orientation B, where outer surface path 11302 extends along a second section 11302B with (e.g., progressively) increasing step height relative to the virtual front plane Pfront.

For example, outer surface path 11302 may have, along the radial direction of the apparatus, an about L-shaped cross-sectional contour. The L-shaped cross-sectional contour may switch or alternative from a first (e.g., upright) orientation A to a second (e.g., inverted) orientation B, with respect to front side 11100.

Inverting outer surface path 11302 from upright outer path section 11302A to inverted outer path section 11302B may facilitate form-fittingly accommodating a portion of active fiber 500 along outer base surface 11300. For example, this way, the fiber 500 is supported from below by upright outer path section 11302A as well as from above by inverted outer path section 11302B.

In addition, the described configuration facilitates continued accommodation of the fiber portion from the outermost front loop to the outer surface path and further from the outer surface path to the outer most back loop.

Transition from the upright orientation A to the inverted orientation B may occur at inversion section 11500. In some examples, inversion section 11500 may be positioned at a location where the fiber accommodated by upright outer path section 11302A has covered about half the outer circumference of the base. In some other examples, inversion section 11500 may be positioned at a location where the fiber portion accommodated by upright outer path section 11302A may have covered less or may have covered more than half of the entire outer circumference of the base.

In some examples, inversion section 11500 may have an outer surface portion that may be free of outer surface path 11302. The outer surface portion may have a smaller radius relative to outer surface path 11302, and is thus retracted or withdrawn relative to the outer surface paths. In some other examples, there may be overlap between upright outer path section 11302A and inverted outer path section 11302B. In some further examples, outlet of upright outer path section 11302A may be aligned with inlet of inverted outer path section 11302B.

Figures 12A, 12B:
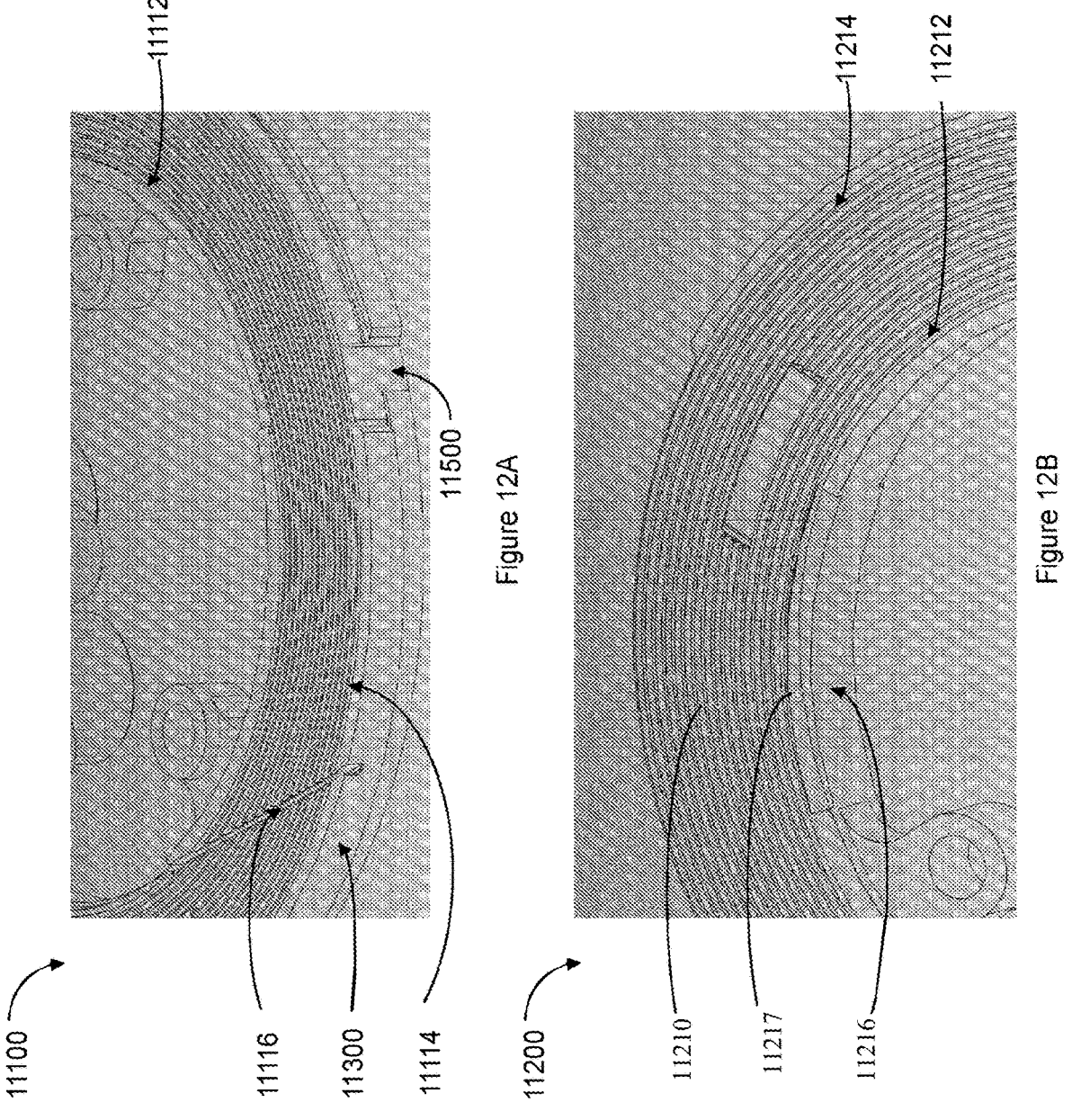
FIGS. 12A and 12B are schematic partial front side views of the compact active fiber packaging apparatus, according to some embodiments.

Additional reference is made to FIG. 12A and FIG. 12B. As already mentioned herein, outer surface path 11302 continuously connects the outlet of the outermost front loop 11114 (FIG. 12A) with the inlet of outermost back loop 11214 (FIG. 12B) of back spiral groove 11210, which terminate at innermost back loop 11212 having an innermost back loop outlet, which interfaces with the inlet of a fiber exit track (or output section) 11216.

In some examples, fiber exit track 11216 may have a curved or arcuate section having a radius of curvature that corresponds to the curvature of inner base surface 11400. In some examples, fiber exit track 11216 may have a ramp 11217 that is sloped relative to virtual back plane Pback to guide an exit portion of the fiber in direction of virtual back plane Pback and, optionally, to extend past or intersect virtual back plane Pback.

In some other examples, a fiber exit track may be buried (not shown) to be disposed underneath back spiral grooves 11210 and extend from inner base surface 11400 to outer base surface 11300. Optionally, the buried fiber exit track may guide the corresponding fiber portion away from the virtual back plane Pback and towards the virtual front plane Pfront, for example, such that an entry point at inner base surface 11400 is at a height that is between front spiral groove 11110 and back spiral groove 11210 to extend and exit on outer base surface 11300 at an exit point without engaging or intersecting with outer surface path 11302, to allow continued accommodation of the active fiber. For example, the exit point of the buried fiber exit track may be offset relative to outer surface path 11302. In some examples, a buried fiber exit track and corresponding surface paths may be analogously configured as fiber entry track 11116, e.g., to facilitate bidirectional pumping of the active fiber for light amplification, while ensuring removal of heat generated in the fiber accommodated in the buried fiber exit track. Hence, fiber entry track 11116 and the buried fiber exit track may both, concurrently, function as an output for amplified output light as well as an input for light to be amplified.

In some embodiments, fiber entry track 11116 and/or fiber exit track 11216 may be configured to facilitate splicing (e.g., through welding) of an input fiber and an output fiber with corresponding ends of the active fiber accommodated by apparatus 10000. For example, fiber entry track 11116 may be configured to facilitate (e.g., linear) splicing of an input fiber with the input portion of the active fiber, and/or fiber exit track 11216 may be configured to facilitate (e.g., linear) splicing of the output portion of the active fiber with an output fiber. In some examples, at least a portion of fiber entry track 11116 and/or fiber exit track 11216 may be linear or substantially linear to facilitate splicing of the active fiber input and output ends with an input fiber and an output fiber of a fiber-based laser amplification system.

Fiber-accommodating grooves of apparatus 10000 such as front spiral groove 11110, back spiral groove 11210, fiber entry track 11116 and/or fiber exit track 11216 may have various cross-sectional geometries, as viewed along their respective longitudinal groove axis. The grooves may for example be U-shaped, V-shaped, or rectangularly shaped.

In some embodiment, desired fiber characteristics of a fiber accommodated by apparatus 10000 such as, for example, fiber loop curvature and/or fiber loop density, may be determined, e.g., experimentally, by determining (e.g., measuring) a characteristic relating to laser efficiency such as, for example, pump power versus output power, while simultaneously monitoring beam quality or mode content (M-squared).

In some embodiments, a desired radius of loops of front spiral groove 11110 and of back spiral groove 11210 may be considered one for which the M-squared of the output beam is in a desired range, which may for example be less than 1.4, less than 1.3, less than 1.2, or less than 1.1, while power efficiency is monitored.

Figures 13A, 13B:
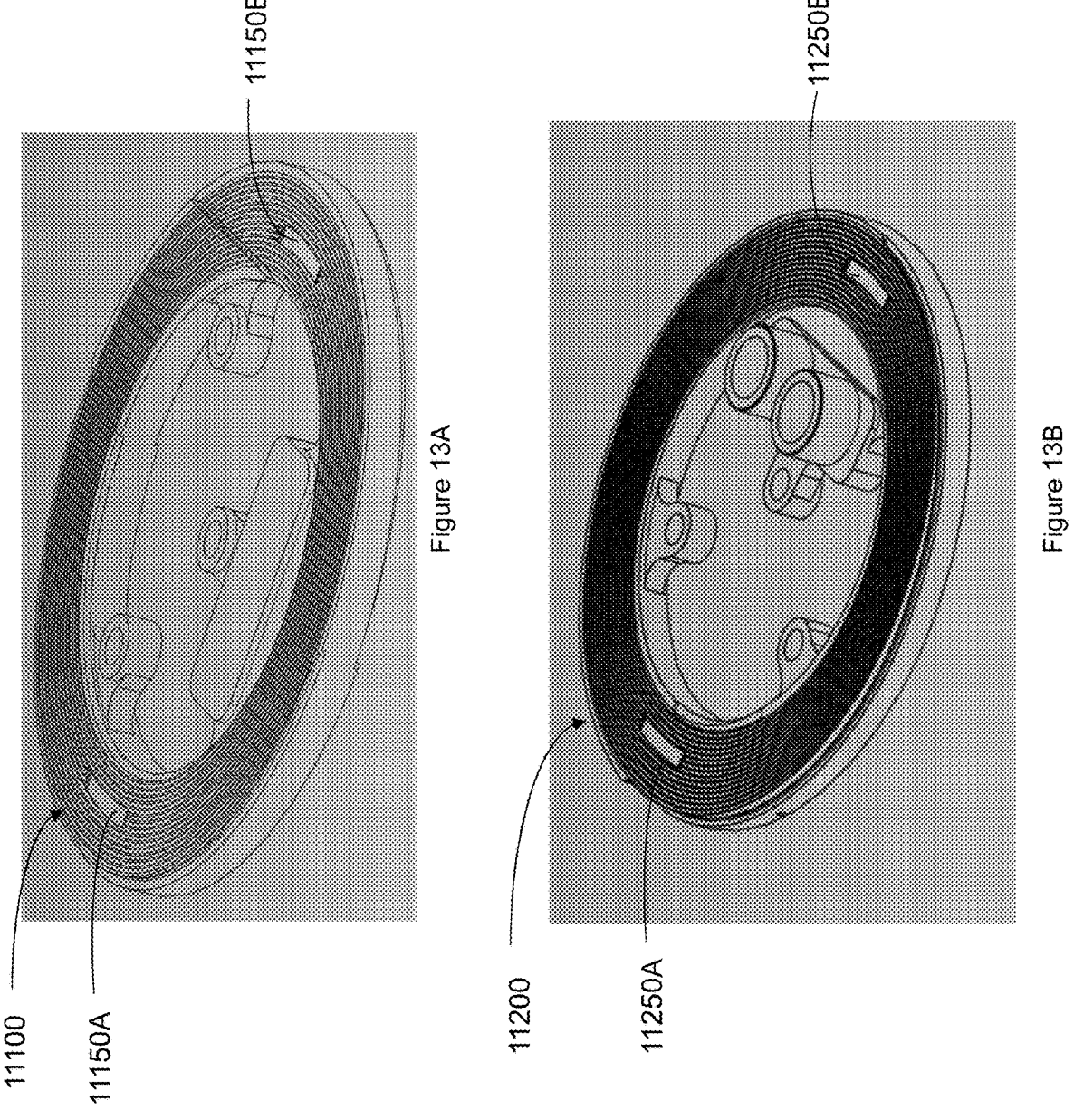
FIG. 13A is an alternative schematic front side view illustration of the compact active fiber packaging apparatus, according to some embodiments.
FIG. 13B is an alternative schematic back side view illustration of the compact active fiber packaging apparatus, according to some embodiments.

Additional reference is made to FIGS. 13A and 13B. In some embodiments, apparatus 10000 may be configured to facilitate selecting and/or adjusting the length of the active fiber (or portion thereof) that is accommodated by apparatus 10000 between the input of fiber entry track 11116 and the output of fiber exit track 11216. The same apparatus may thus be employed for accommodating, in different setups, active fibers of different lengths. Front side 11100 and/or back side 11200 may for example be configured to facilitate skipping (e.g., entire) loops of front spiral groove 11110 and/or of back spiral groove 11210, respectively.

For example, when accommodated without skipping loops, a $n_{th}$ portion of the active fiber may be accommodated by the $n_{th}$ loop of a spiral groove, and the subsequent $n_{th+1}$ portion of the active fiber may be accommodated by the subsequent $n_{th+1}$ loop. In an example accommodation with skipping, a $n_{th}$ portion of the active fiber may be accommodated by the $n_{th}$ loop of a spiral groove, and the subsequent $n_{th+1}$ portion of the active fiber may be accommodated or by the $n_{th+2}$ loop, by skipping the $n_{th+1}$ loop of the spiral groove.

For example, front side 11100 may include one or more groove-free sections 11250 (e.g., sections 11150A and 11150B, and/or back side 11200 may include one or more groove-free sections 11250 (e.g., sections 11250A and 11150B). Such groove-free sections (also: cutouts or windows), may allow accommodating a fiber by skipping one or more selected loops of the corresponding spiral groove, without requiring lifting of the fiber over grooves of loops selected to be skipped. According to some embodiments, such groove-free section provided in the spiral grooves may have various shapes and/or sizes.

In some embodiments, a fiber may be coupled with base 11000 by employing a fastener substance which is applied in groove portions of the apparatus. For example, a fastener substance that may be applied, e.g., to the fiber and/or to the grooves for, e.g., non-removably, securing the fiber in the groove.

Such fastener substance may include a potting substance, fiber recoat material (Luvantix™ PC-373, or MyPolymers™ MY-137), a thermal adhesive, and/or a light transitive adhesive (NuSil™ LS-3246) that may be applied e.g., to the fiber and/or to the grooves. A fastener substance may be applied to front spiral groove 11110, back spiral groove 11210, to fiber entry track 11116, to fiber exit track 11216, to outer surface path 11302 and/or to inner surface path 11402.

The fastener substance may be transparent for allowing light to escape from the fiber rather than being absorbed by the fiber. Such unwanted absorption can cause increased temperature spots resulting in fiber burn or potting compound burn.

Figures 14A, 14B:
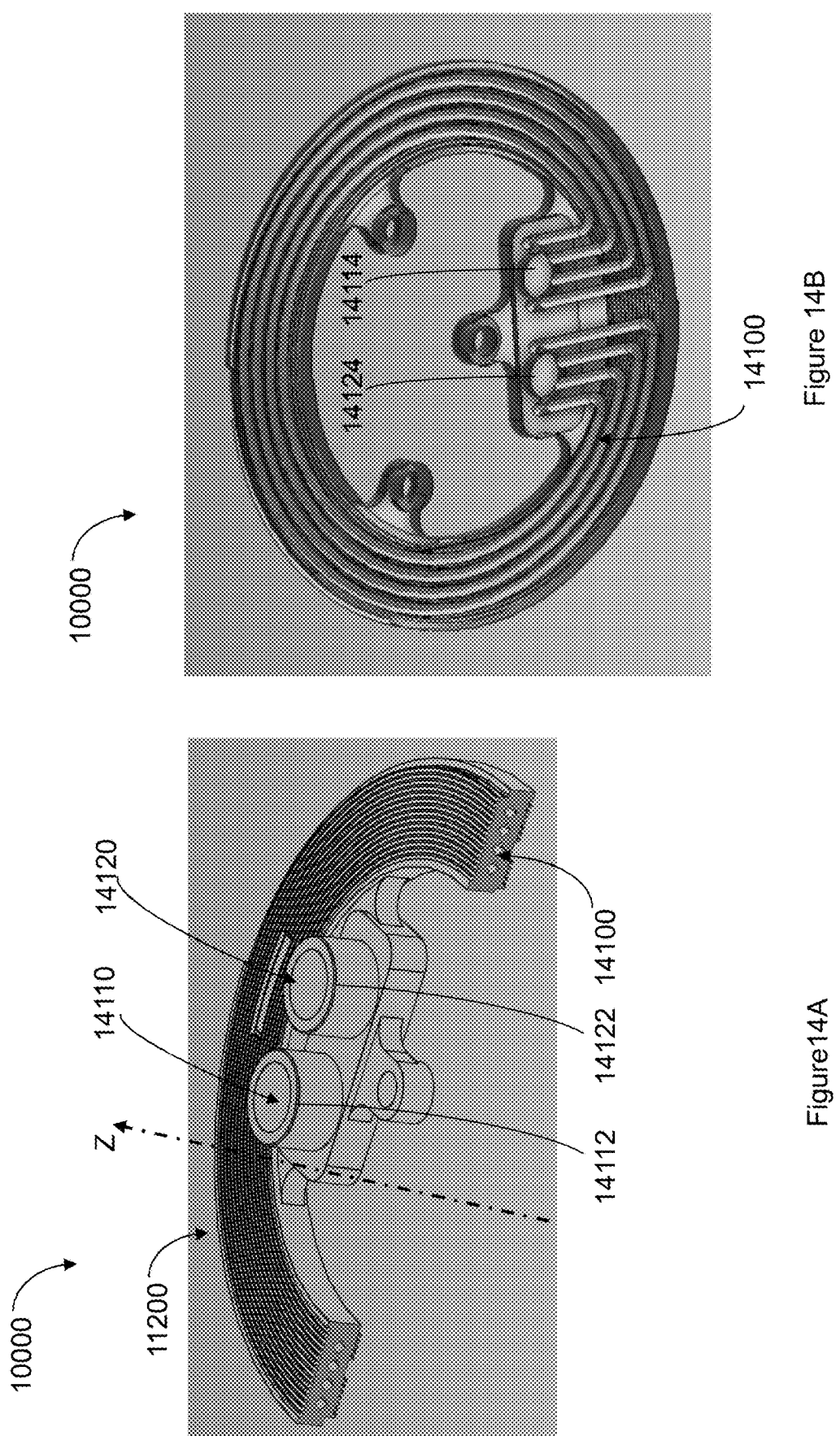
FIGS. 14A and 14B are schematic illustrations of fluid conduits of the compact active fiber packaging apparatus, according to some embodiments.

Additional reference is made to FIGS. 14A and 14B. Apparatus 10000 may include cooling piping configured to allow flow of cooling fluid through the piping for the removal of heat generated during operation of the active fiber accommodated by apparatus 10000 through thermal convection and/or conduction.

The cooling piping may include at least one fluid conduit 14100 extending from a fluid inlet conduit (also: fluid inlet connector) 14110, employed for receiving new cooling fluid, and terminates at a fluid outlet conduit (also: fluid outlet connector) 14120, employed for the removal of used cooling fluid. Fluid conduits 14100 are arranged within base 11000 between front spiral groove 11110 and back spiral groove 11210. The course of the fluid conduits shown in FIG. 14B is an example only and should not be construed in a limiting manner.

Figures 15A, 15B, 15C, 15D, 15E, 15F:
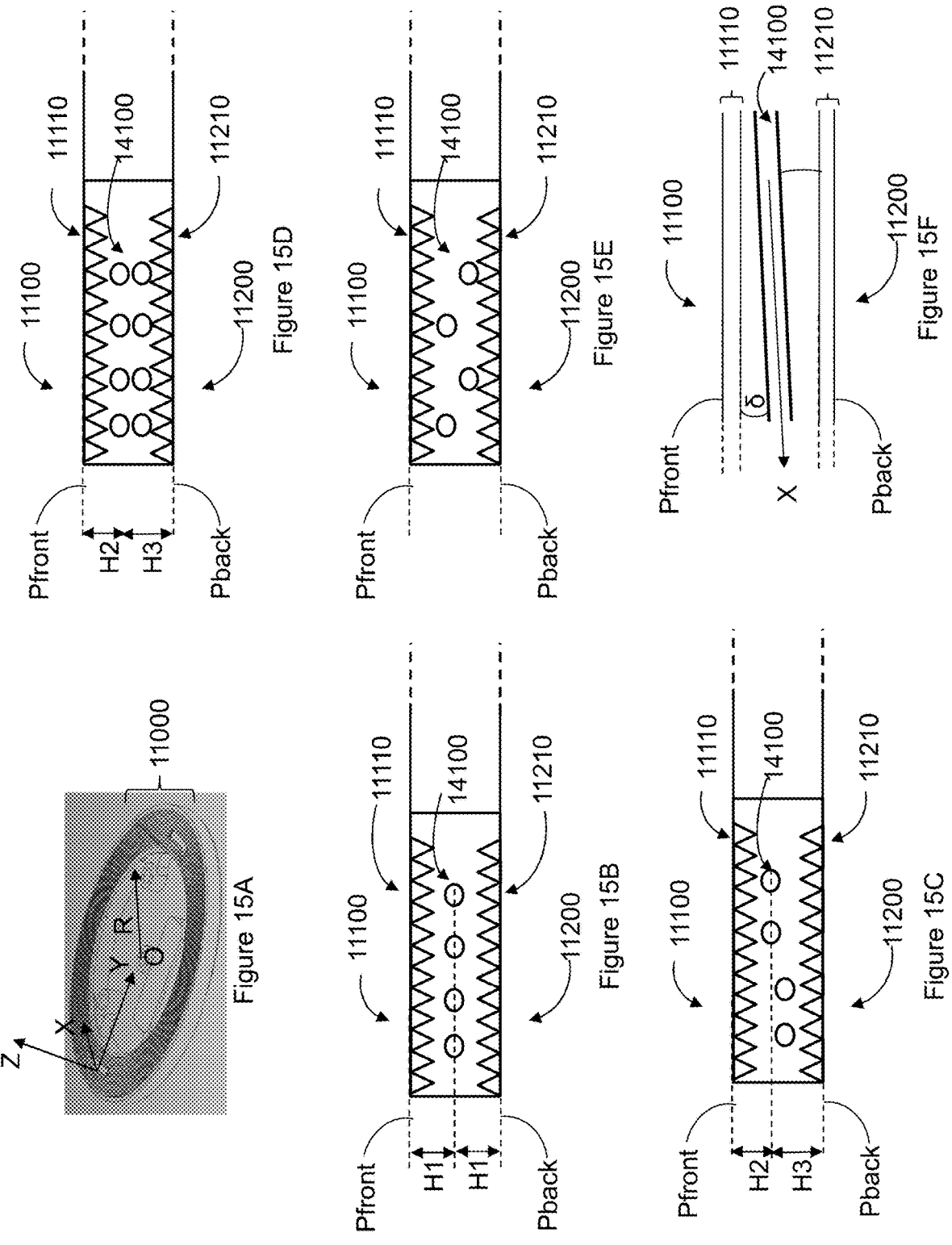
FIG. 15A shows a local coordinate system of the compact active fiber packaging apparatus, according to some embodiments.
FIGS. 15B-15F are schematic cross-sectional views of fluid conduits of, according to respective embodiments.

Further reference is made to FIGS. 15A to 15E. FIG. 15A schematically shows a local reference coordinate system, where axis X indicates a longitudinal direction of fluid conduits 14100 as viewed in a cross-sectional plane that is perpendicular to a virtual front or virtual back plane, where axis Y lies in the cross-sectional plane and points in a direction opposite to a radius R originating from a center point O of base plate 11000 and, where axes X, Z and Y are all orthogonal relative to each other. Axis Z may be considered to extend in a direction that is normal to the virtual front surface Pfront.

Merely to simplify the discussion that follows and without be construed as limiting, fluid conduits 14100 shown in FIGS. 15B to 15F have an about circular cross-sectional geometry. In some examples, the at least one fluid conduit 14100 may be equidistantly arranged between front spiral groove 11110 and back spiral groove 11210 (FIG. 15B). In some examples, as for instance shown in FIG. 15C, one or more fluid conduits 14100 may be arranged closer to front spiral groove 11110 than to back spiral groove 11210 and/or one or more (other) conduits may be arranged closer to back spiral groove 11210 than to front spiral groove 11110.

In some embodiments, a plurality of fluid conduits 14100 may be arranged in a same plane. In some embodiments, a plurality of conduits 14100 may be arranged in a 1×n arrangement, as schematically shown in FIG. 14A, showing in the cross-sectional perspective the example of 1 row and 4 columns relative to a virtual plane defined by elements of the front or back side of the base. In some other embodiments, as for example shown in FIG. 15D, a plurality of conduits may be arranged in an m×n arrangement, where m>1 and n>1. For example, the conduits may be arranged, in the shown cross-sectional perspective, in 2 rows and four columns.

In some examples, as shown in the example of FIG. 15E, the conduits may be arranged in an alternating manner in a plane defined by the axes Y and Z.

In some examples, a fluid conduit 14100 may have a slope relative to virtual front plane Pfront and/or virtual back plane Pback, e.g., to traverse an about helical path within the base. In some examples, the slope (schematically shown as angle δ) may be such that a fluid conduit 14100 moves away from virtual front plane Pfront (cf. FIG. 15F) as it (e.g., circumferentially) extends within base 11000. In some examples, the slope may be in direction such that that a fluid conduit 14100 comes closer to virtual front plane Pfront as it (e.g., circumferentially) extends within base 11000 in direction X.

Fluid inlet connector 14110 may extend in about perpendicular direction Z relative to back side 11200 from a distal inlet end 14112 (FIG. 14A) end to terminate at proximal inlet end 14114 (FIG. 14B), relative to base 11000. Proximal inlet end 14114 is in fluid communication with at least one fluid conduit 14100 that, e.g., circumferentially, extends within base 11000 to terminate at proximal outlet end 14124 of outlet conduit 14120 for removing used fluid conduit via distal outlet end 14122.

In some embodiments, each one of a plurality of fluid conduits may traverse different path lengths. In some examples, at least two of the plurality of fluid conduits may be concentrically arranged and at least partially cover an about circumferential path.

Optionally, a curvature of a fluid conduit 14100 may about correspond to the curvature of front spiral groove 11110 and/or back spiral groove 11210.

A fluid conduit 14100 may have a variety of cross-sectional geometries, including, for example, circular or elliptical cross-sections; polygonal geometries such as triangular, rectangular, or rhombus-shaped (cf. FIG. 14A) cross-sectional geometries. In some examples, at least two of a plurality of fluid conduits 14100 may have different cross-sectional geometries. In some examples, the cross-sectional geometry of a same fluid conduit may change, along its longitudinal axis, from a first cross-sectional geometry to a second cross-sectional geometry that is different from the first cross-sectional geometry.

Figure 16:
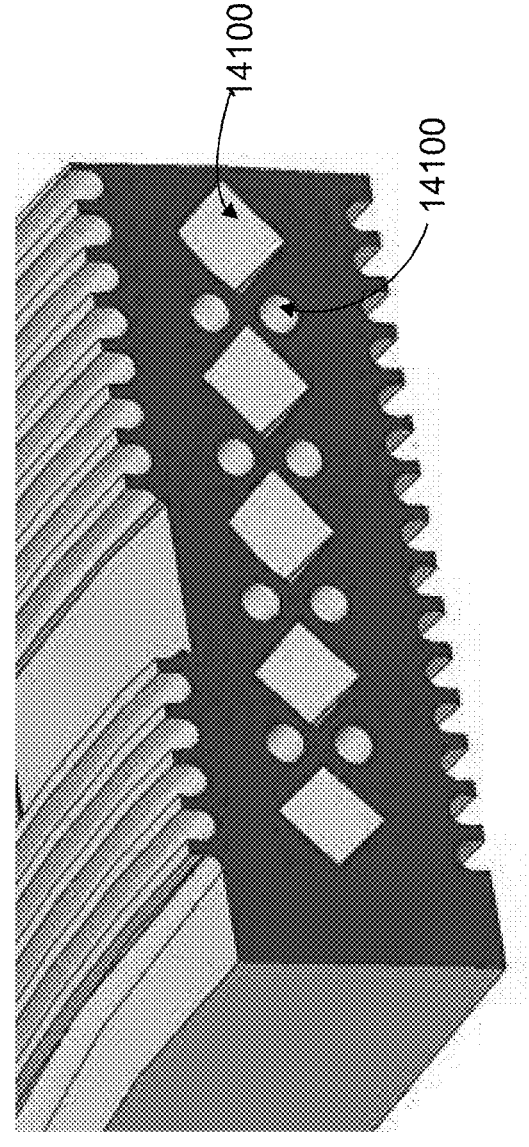
FIG. 16 is a cross-sectional view of fluid conduits, according to a further embodiment.

FIG. 16 shows another embodiment of an arrangement of fluid conduits 14100.

Figure 17:
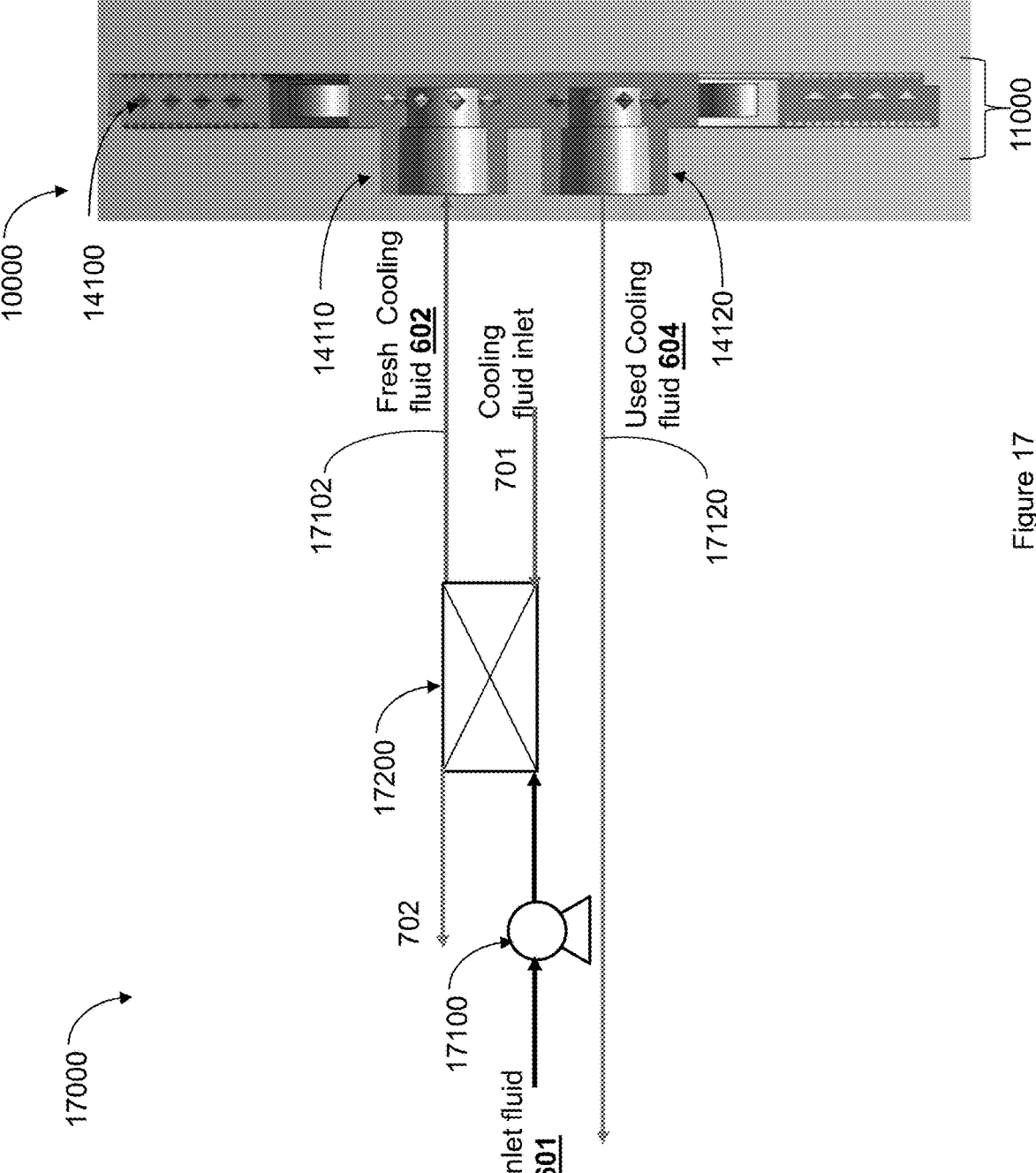
FIG. 17 is a schematic illustration of a cooling system for cooling of an optical fiber accommodated by the compact active fiber packaging apparatus, according to some embodiments.

Further reference is made to FIG. 17. A cooling system 17000 for a fiber packaging apparatus 10000 may include a pump device 17100 configured to impart energy onto inlet fluid 601 to cause flow (e.g., circulation) of the inlet fluid 601 through a heat exchanger or chiller 17200 generating fresh cooling fluid 602 for circulation through the one or more fluid conduits of packaging apparatus 10000. In some examples, Inlet fluid 601 may be cooled by inlet heat exchanger of chiller fluid 701, which is then expelled as used heat exchanger or chiller fluid 702.

In some examples, fresh cooling fluid 602 enters from fluid inlet piping 17102 via fluid inlet connector 14110 into fluid conduits 14100, circulate through the fluid conduits for cooling of the active fiber during operation, and leave as used cooling fluid 604 the conduits 14100 via outlet connector 14120 into outlet piping 17120.

In some embodiments, cooling system 17000 may be considered to comprise pump device 17100, inlet piping 17110, fluid inlet connector 14110, fluid conduits 14100, fluid outlet connector 14120 and outlet piping 17120.

In embodiment, the cooling system may be configured to recirculate the cooling fluid a plurality of times through the conduits.

Additional reference is made to FIG. 18. As indicated by block 18100, a method for guiding an active fiber: providing a compact fiber packaging apparatus configured to accommodate the active fiber, wherein the apparatus comprises:

a base having a front side and a back side, wherein the front side comprises a front spiral groove of varying radii increasingly extending from an innermost front loop having an innermost radius to an outermost front loop having an outermost radius; wherein the back side comprises a back spiral groove of varying radii decreasingly extending from an outermost back loop having an outermost radius to an innermost back loop having an innermost radius; wherein the innermost radius is smaller than the outermost radius; wherein the front spiral groove extends from the innermost front loop to the outermost front loop which connects with the outermost back loop of the back spiral groove to terminate at the innermost back loop, and wherein the base has thickness sufficient to include fluid conduits which enable cooled gas or cooled fluid to flow through them for cooling of the active fiber.

As indicated by block 18200, the method may further include accommodating the active fiber in the front spiral grooves and back spiral grooves of the compact fiber packaging apparatus.

ADDITIONAL EXAMPLES

Example 1 pertains to a compact fiber packaging apparatus configured to guide an active fiber as part of a fiber laser amplifier, the apparatus comprising:

a base having a front side and a back side;

wherein the front side comprises a front spiral groove of varying radii increasingly extending from an innermost front loop having an innermost radius to an outermost front loop having an outermost radius;

wherein the back side comprises a back spiral groove of varying radii decreasingly extending from an outermost back loop having an outermost radius to an innermost back loop having an innermost radius;

wherein the innermost radius is smaller than the outermost radius;

wherein the front spiral groove extends from the innermost front loop to the outermost front loop which connects with the outermost back loop of the back spiral groove to terminate at the innermost back loop, and wherein the base includes fluid conduits which enable cooled fluid to flow through them for cooling of the active fiber.

Example 2 includes the subject matter of Example 1 and, optionally, wherein the outermost front loop connects with the outermost back loop of the back spiral groove over an external surface of the base, optionally, on a helical path.

Example 3 includes the subject matter of any one or more of the examples 1 or 2, wherein the innermost front loop terminates in a front input section configured for splicing an input fiber with the input section and/or the innermost back loop terminates in a back output section configured for splicing of an output fiber with the output section.

Example 4 includes the subject matter of example 3 and, optionally, wherein the input section extends distally into the base underneath the front spiral groove; and wherein the output section extends distally into the base underneath or above the back spiral groove.

Example 5 includes the subject matter of Example 4 and, optionally, wherein the front input section and/or the back output section are straight linear or curved sections.

Example 6 includes the subject matter of any one or more of the Examples 1 to 5 and, optionally, wherein the front spiral groove comprises front loops; and wherein the back spiral groove comprises back loops to allow accommodation of corresponding portions of the active fiber.

Example 7 includes the subject matter of Example 6 and, optionally, wherein the front loops and/or the back loops are coplanar.

Example 8 includes the subject matter of any one or more of the Examples 1 to 7 and, optionally, wherein the base comprises one or more fluid conduits that are arranged within the base between the front spiral groove and the back spiral groove, the one or more fluid conduits being configured to allow flow of a cooling fluid for cooling an active fiber accommodatable in the front spiral groove and the back spiral groove by thermal conduction.

Example 9 includes the subject matter of Example 8 and, optionally, wherein a plurality of the one or more fluid conduits are arranged to delineate coplanar loops.

Example 10 includes the subject matter of any one or more of the Examples 8 to 9 and, optionally, wherein the one or more fluid conduits have at least one fluid inlet and fluid outlet.

Example 11 includes the subject matter of any one or more of the Examples 1 to 10 and, optionally, a fastener for securing the active fiber within the front and the back spiral groove.

Example 12 includes the subject matter of Example 11 and, optionally, wherein the fastener includes an adhesive and/or potting material.

Example 13 includes the subject matter of any one or more of the preceding examples, wherein the active fiber may be part of an oscillator-based laser or an amplifier-based laser.

Example 14 pertains to a cooling system for cooling an apparatus. The system may for example comprise one or more fluid conduits, a heat exchanger or chiller for cooling inlet fluid to generate cooling fluid; and a pump device configured to impart energy onto the cooling fluid to cause flow of the cooling fluid through the one or more fluid conduits.

Example 15 pertains to a method for manufacturing an apparatus, for example, according to any one or more of the Examples 1 to 12, the method comprising: providing a base having a front side and a back side;

wherein the front side comprises a front spiral groove of varying radii increasingly extending from an innermost front loop having an innermost radius to an outermost front loop having an outermost radius;

wherein the back side comprises a back spiral groove of varying radii decreasingly extending from an outermost back loop having an outermost radius to an innermost back loop having an innermost radius;

wherein the innermost radius is smaller than the outermost radius;

wherein the front spiral groove extends from the innermost front loop to the outermost front loop which connects with the outermost back loop of the back spiral groove to terminate at the innermost back loop, and wherein the base includes fluid conduits which enable cooled gas or cooled fluid to flow through them for cooling of the active fiber.

Example 16 pertains to a method for guiding an active fiber as part of a fiber laser, the method comprising:

providing a compact fiber packaging apparatus configured to accommodate the active fiber, wherein the apparatus comprises:

a base having a front side and a back side;

wherein the front side comprises a front spiral groove of varying radii increasingly extending from an innermost front loop having an innermost radius to an outermost front loop having an outermost radius;

wherein the back side comprises a back spiral groove of varying radii decreasingly extending from an outermost back loop having an outermost radius to an innermost back loop having an innermost radius;

wherein the innermost radius is smaller than the outermost radius;

wherein the front spiral groove extends from the innermost front loop to the outermost front loop which connects with the outermost back loop of the back spiral groove to terminate at the innermost back loop; and wherein the base has thickness sufficient to include fluid conduits which enable cooled gas or cooled fluid to flow through them for cooling of the active fiber; and accommodating the active fiber in the front spiral grooves and back spiral grooves of the compact fiber packaging apparatus.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

In the discussion, unless otherwise stated, adjectives such as "substantially" and "about" that modify a condition or relationship characteristic of a feature or features of an embodiment of the apparatus, are to be understood to mean that the condition or characteristic is defined to within tolerances that are acceptable for operation of the embodiment for an application for which it is intended.

Unless otherwise specified, the terms 'about' and/or 'close' with respect to a magnitude or a numerical value may imply to be within an inclusive range of −10% to +10% of the respective magnitude or value.

Unless otherwise specified, the terms 'about' or 'close' imply at or in a region of, or close to a location or a part of an object relative to other parts or regions of the object.

Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

"Coupled with" means indirectly or directly "coupled with".

As used herein, unless otherwise specified, the use of the ordinal adjectives "first", "second", etc., to describe like objects, merely indicate that different instances of like objects are being referred to and are not intended to imply that the objects so described must be in a given sequence, temporally, in ranking, and/or in any other manner.

The descriptions of the various embodiments of the present apparatus have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A compact fiber packaging apparatus configured to guide an active fiber as part of a high-power fiber laser, the apparatus comprising:

a base having a front side, a back side, and an outer base surface extending between outer rims of the front side and the back side;

wherein the front side comprises a front spiral groove of varying radii increasingly extending from an innermost front loop having an innermost radius to an outermost front loop having an outermost radius;

wherein the back side comprises a back spiral groove of varying radii decreasingly extending from an outermost back loop having an outermost radius to an innermost back loop having an innermost radius;

wherein the innermost radius is smaller than the outermost radius; and wherein the front spiral groove extends from the innermost front loop to the outermost front loop, and wherein the outermost front loop is configured to operably connect, via the outer base surface, with the outermost back loop of the back spiral groove to terminate at the innermost back loop such to eliminate or prevent thermal mode instability (TMI) of the active fiber, while avoiding overbending of the active fiber;

wherein the base includes fluid conduits which enable cooled fluid to flow through them for cooling of the active fiber.

2. The apparatus of claim 1, wherein the outermost front loop connects with the outermost back loop of the back spiral groove over an external surface of the base.

3. The apparatus of claim 2, wherein the innermost front loop terminates in a front input section configured for splicing an input fiber with the input section and/or the innermost back loop terminates in a back output section configured for splicing of an output fiber with the output section.

4. The apparatus of claim 3, wherein the input section extends distally into the base underneath the front spiral groove; and wherein the output section extends distally into the base underneath or above the back spiral groove.

5. The apparatus of claim 4, wherein the front input section and/or the back output section are straight linear sections.

6. The apparatus of claim 5, wherein the front loops and/or the back loops are coplanar.

7. The apparatus of claim 1, wherein the front spiral groove comprises front loops; and wherein the back spiral groove comprises back loops to allow accommodation of corresponding portions of the active fiber.

8. The apparatus of claim 1, wherein the base comprises one or more fluid conduits that are arranged within the base between the front spiral groove and the back spiral groove, the one or more fluid conduits being configured to allow flow of a cooling fluid for cooling the active fiber accommodatable in the front spiral groove and the back spiral groove by thermal conduction.

9. The apparatus of claim 8, wherein a plurality of the one or more fluid conduits is arranged to delineate coplanar loops.

10. The apparatus of claim 9, wherein one or more fluid conduits have at least one fluid inlet and fluid outlet.

11. The apparatus of claim 8, wherein the one or more fluid conduits have at least one fluid inlet and fluid outlet.

12. The apparatus of claim 1, further comprising a fastener for securing the active fiber within the front and the back spiral groove.

13. The apparatus of claim 12, wherein the fastener includes an adhesive and/or potting material.

14. The apparatus of claim 1, wherein the active fiber may be part of an oscillator-based laser or an amplifier-based laser.

15. A method for guiding an active fiber by providing a compact fiber packaging apparatus according to claim 1.

16. A cooling system for cooling a compact fiber packaging apparatus configured to guide an active fiber as part of a high-power fiber laser, the apparatus comprising a base having a front side, a back side, an outer base surface extending between outer rims of the front side and the back side;

wherein the front side of the compact fiber packaging apparatus comprises a front spiral groove of varying radii increasingly extending from an innermost front loop having an innermost radius to an outermost front loop having an outermost radius;

wherein the back side comprises a back spiral groove of varying radii decreasingly extending from an outermost back loop having an outermost radius to an innermost back loop having an innermost radius;

wherein the outermost front loop is configured to operably connect, via the outer base surface with the outermost back loop of the back spiral groove to terminate at the innermost back loop such to eliminate or prevent thermal mode instability (TMI) of the active fiber while avoiding overbending of the active fiber; and wherein the cooling system comprises:

one or more fluid conduits that are arranged within the base between the front spiral groove and the back spiral groove, wherein the one or more fluid conduits being configured to allow flow of a cooling fluid for cooling an active fiber accommodatable in the front spiral groove and the back spiral groove by thermal conduction;

a heat exchanger and/or chiller for cooling inlet fluid to generate cooling fluid; and a pump device configured to impart energy onto the cooling fluid to cause flow of the cooling fluid through the one or more fluid conduits.

17. The cooling system of claim 16, wherein plurality of the one or more fluid conduits is arranged to delineate coplanar loops.

18. The cooling system of claim 16, wherein the one or more fluid conduits have at least one fluid inlet and fluid outlet.

19. The cooling system of claim 17, wherein the one or more fluid conduits have at least one fluid inlet and fluid outlet.

20. A method for cooling a compact fiber packaging apparatus according to claim 16.

* * * * *